(12) United States Patent
McDaniel et al.

(10) Patent No.: US 11,912,809 B2
(45) Date of Patent: Feb. 27, 2024

(54) HIGH POROSITY FLUORIDED SILICA-COATED ALUMINA ACTIVATOR-SUPPORTS AND USES THEREOF IN METALLOCENE-BASED CATALYST SYSTEMS FOR OLEFIN POLYMERIZATION

(71) Applicant: Chevron Phillips Chemical Company LP, The Woodlands, TX (US)

(72) Inventors: Max P. McDaniel, Bartlesville, OK (US); Eric D. Schwerdtfeger, Bartlesville, OK (US); Qing Yang, Bartlesville, OK (US); Carlos A. Cruz, Kingwood, TX (US); Jinping J. Zhou, Bartlesville, OK (US); Anand Ramanathan, Bartlesville, OK (US); Kathy S. Clear, Bartlesville, OK (US); Zhihui Gu, Bellarie, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 18/327,119

(22) Filed: Jun. 1, 2023

(65) Prior Publication Data
US 2023/0391897 A1    Dec. 7, 2023

Related U.S. Application Data

(60) Provisional application No. 63/348,044, filed on Jun. 2, 2022.

(51) Int. Cl.
| | |
|---|---|
| *B01J 23/00* | (2006.01) |
| *C08F 4/02* | (2006.01) |
| *B01J 29/06* | (2006.01) |
| *B01J 35/10* | (2006.01) |
| *C08F 210/16* | (2006.01) |

(52) U.S. Cl.
CPC .............. *C08F 4/025* (2013.01); *B01J 29/06* (2013.01); *B01J 35/1019* (2013.01); *B01J 35/1042* (2013.01); *B01J 35/1047* (2013.01); *B01J 35/1061* (2013.01); *C08F 210/16* (2013.01); *C08F 2420/00* (2013.01)

(58) Field of Classification Search
None
See application file for complete search history.

(56) References Cited

U.S. PATENT DOCUMENTS

| | | | |
|---|---|---|---|
| 3,242,099 A | 3/1966 | Manyik | |
| 3,248,179 A | 4/1966 | Norwood | |
| 4,501,885 A | 2/1985 | Sherk | |
| 4,588,790 A | 5/1986 | Jenkins, III | |
| 4,794,096 A | 12/1988 | Ewen | |
| 4,808,561 A | 2/1989 | Welborn, Jr. | |
| 5,352,749 A | 10/1994 | Dechellis | |
| 5,436,304 A | 7/1995 | Griffin | |
| 5,565,175 A | 10/1996 | Hottovy | |
| 5,575,979 A | 11/1996 | Hanson | |
| 5,576,259 A | 11/1996 | Hasegawa | |
| 5,807,938 A | 9/1998 | Kaneko | |
| 5,919,983 A | 7/1999 | Rosen | |
| 6,239,235 B1 | 5/2001 | Hottovy | |
| 6,262,191 B1 | 7/2001 | Hottovy | |
| 6,833,415 B2 | 12/2004 | Kendrick | |
| 7,026,494 B1 | 4/2006 | Yang | |
| 7,041,617 B2 | 5/2006 | Jensen | |
| 7,199,073 B2 | 4/2007 | Martin | |
| 7,226,886 B2 | 6/2007 | Jayaratne | |
| 7,294,599 B2 | 11/2007 | Jensen | |
| 7,312,283 B2 | 12/2007 | Martin | |
| 7,517,939 B2 | 4/2009 | Yang | |
| 7,531,606 B2 | 5/2009 | Hendrickson | |
| 7,598,327 B2 | 10/2009 | Shaw | |
| 7,601,665 B2 | 10/2009 | McDaniel | |
| 7,619,047 B2 | 11/2009 | Yang | |
| 7,799,721 B2 | 9/2010 | Yang | |
| 7,884,163 B2 | 2/2011 | McDaniel | |
| 7,919,639 B2 | 4/2011 | Murray | |
| 8,058,200 B2 | 11/2011 | Yang | |
| 8,114,946 B2 | 2/2012 | Yang | |
| 8,119,553 B2 | 2/2012 | Yang | |
| 8,309,485 B2 | 11/2012 | Yang | |
| 8,536,391 B2 | 9/2013 | Small | |
| 8,822,608 B1 | 9/2014 | Bhandarkar | |
| 8,916,494 B2 | 12/2014 | McDaniel | |
| 9,023,959 B2 | 5/2015 | McDaniel | |
| 9,163,098 B2 | 10/2015 | McDaniel | |
| 9,663,594 B2 | 5/2017 | Hlavinka | |
| 9,926,393 B2 | 3/2018 | Ding | |
| 11,124,586 B1 | 9/2021 | McDaniel | |
| 11,186,656 B2 | 11/2021 | McDaniel | |

FOREIGN PATENT DOCUMENTS

| | | |
|---|---|---|
| WO | 2010060555 A1 | 6/2010 |
| WO | 2011037971 A1 | 3/2011 |

(Continued)

OTHER PUBLICATIONS

Partial Search Report issued in corresponding PCT Application No. PCT/US2023/067758, dated Sep. 19, 2023, 3 pp.

(Continued)

*Primary Examiner* — Yun Qian
(74) *Attorney, Agent, or Firm* — Merchant & Gould P.C.

(57) ABSTRACT

Fluorided silica-coated alumina activator-supports have a bulk density from 0.15 to g/mL, a total pore volume from 0.85 to 2 mL/g, a BET surface area from 200 to 500 m²/g, an average pore diameter from 10 to 25 nm, and from 80 to 99% of pore volume in pores with diameters of greater than 6 nm. Methods of making the fluorided silica-coated alumina activator-supports and using the fluorided silica-coated aluminas in catalyst compositions and olefin polymerization processes also are described. Representative ethylene-based polymers produced using the compositions and processes have a melt index of 0.1 to 10 g/10 min and a density of 0.91 to 0.96 g/cm³, and contain from 70 to 270 ppm solid oxide and from 2 to 18 ppm fluorine.

16 Claims, 5 Drawing Sheets

(56) References Cited

FOREIGN PATENT DOCUMENTS

| WO | 2020068525 A1 | 4/2020 |
|---|---|---|
| WO | 2021055184 | 3/2021 |

OTHER PUBLICATIONS

Barrett, et al., "The Determination of Pore Volume and Area Distributions in Porous Substances. I. Computations From Nitrogen Isotherms," J. Am. Chem. Soc., vol. 73, Jan. 1951, pp. 373-380.

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.

Brunauer, et al., "Adsorption of Gases in Multimolecular Layers," Journal of the American Chemical Society. 1938, vol. 60, pp. 309-319.

Film Extrusion Manual—Process, Materials, Properties, TAPPI Press, 1992, 16 pages.

George Halsey, "Physical Adsorption on Non-Uniform Surfaces," Journal Chem. Phys., vol. 16, Mar. 9, 1948, pp. 931-937.

Hieber, C. A., et al., "Shear-rate-dependence modeling of polymer melt viscosity," Polymer Engineering and Science, Jul. 1992, pp. 931-938, vol. 32, No. 14.

Hieber, C. A., et al., "Some correlations involving the shear viscosity of polystyrene melts," Rheol Acta, 1989, pp. 321-332, vol. 28.

IUPAC Compendium of Chemical Terminology, 2nd Ed. 1997, pp. 1-1670.

McDaniel, "Influence of Catalyst Porosity on Ethylene Polymerization", ACS Catal., 2011, 1, 10, pp. 1394-1407. DOI:10.1021/cs2003033.

McDaniel, "Total porosity of high-pore-volume silicas by liquid adsorption", Journal of Colloid and Interface Science, vol. 78, No. 1, Nov. 1980. DOI:10.1016/0021-9797(80)90492-0.

Modern Plastics Encyclopedia, Mid-Nov. 1995 Issue, vol. 72, No. 12, 3 pages.

US 11,912,809 B2

HIGH POROSITY FLUORIDED SILICA-COATED ALUMINA ACTIVATOR-SUPPORTS AND USES THEREOF IN METALLOCENE-BASED CATALYST SYSTEMS FOR OLEFIN POLYMERIZATION

REFERENCE TO RELATED APPLICATION

This application claims the benefit of U.S. Provisional Patent Application No. 63/348,044, filed on Jun. 2, 2022, the disclosure of which is incorporated herein by reference in its entirety.

FIELD OF THE INVENTION

The present disclosure generally relates to fluorided solid oxide activator-supports, methods for making the activator-supports, metallocene-based catalyst compositions containing the activator-supports, methods for using the catalyst compositions to polymerize olefins, and the polymer resins produced using such catalyst compositions. More particularly, the present disclosure relates to fluorided silica-coated alumina activator-supports with higher pore volume and porosity, and having average pore diameters greater than 10 nm in diameter.

BACKGROUND OF THE INVENTION

It would be beneficial to produce solid activator-supports that have increased catalytic activity in olefin polymerization processes, for example, using metallocene-based catalyst systems for the production of ethylene-based polymers. An increase in catalytic activity of the solid activator-support results in a reduction in the amount of the metallocene component required in the catalyst system, which can translate to significant cost savings. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Aspects of this invention are directed to fluorided silica-coated alumina activator-supports. For instance, in one aspect, the fluorided silica-coated alumina can have (or can be characterized by) a bulk density from 0.15 to 0.37 g/mL, a total pore volume from 0.85 to 2 mL/g, a BET surface area from 200 to 500 m$^2$/g, and an average pore diameter from 10 to 25 nm. In another aspect, the fluorided silica-coated alumina can have (or can be characterized by) a bulk density from 0.15 to 0.37 g/mL, a total pore volume from 0.85 to 2 mL/g, a BET surface area from 200 to 500 m$^2$/g, and from 80 to 99% of pore volume of the fluorided silica-coated alumina in pores with diameters of greater than 6 nm.

Catalyst compositions also are provided herein, and such catalyst compositions can comprise a metallocene compound, any of the fluorided silica-coated alumina activator-supports disclosed herein, and an optional co-catalyst. Olefin polymerization processes also are encompassed, and such processes can comprise contacting any of the catalyst compositions provided herein with an olefin monomer and an optional olefin comonomer in a polymerization reactor system under polymerization conditions to produce an olefin polymer.

Another aspect of the invention is a process to produce a fluorided silica-coated alumina, and in this aspect, the process can comprise contacting a fluoriding agent with a silica-coated alumina to produce the fluorided silica-coated alumina. The silica-coated alumina can have (or can be characterized by) a bulk density from 0.15 to 0.37 g/mL, a total pore volume from 1.1 to 2.5 mL/g, a BET surface area from 250 to 600 m$^2$/g, and an average pore diameter from 10 to 25 nm.

In yet another aspect, supported metallocene catalysts are provided and such catalysts can comprise a metallocene compound and a fluorided silica-coated alumina. The amount of the metallocene compound adsorbed per gram of the fluorided silica-coated alumina can be at least 55 μmol/g (such as from 60 to 130 μmol/g) and/or the number of molecules of the metallocene compound adsorbed per nm 2 of surface area of the fluorided silica-coated alumina can be at least 0.1 molecules per nm 2 (such as from 0.1 to 0.3 molecules per nm 2).

Other aspects of this invention are directed to ethylene polymers (which are typically in the form of pellets or beads) characterized by a melt index (MI) in a range from 0.1 to 10 g/10 min and a density in a range from 0.91 to 0.96 g/cm$^3$. These ethylene polymers can contain from 70 to 270 ppm solid oxide (e.g., silica-coated alumina) and from 2 to 18 ppm fluorine. Further, such ethylene polymers also can contain from 0.5 to 5 ppm of zirconium or hafnium.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

DEFINITIONS

Figure 1:
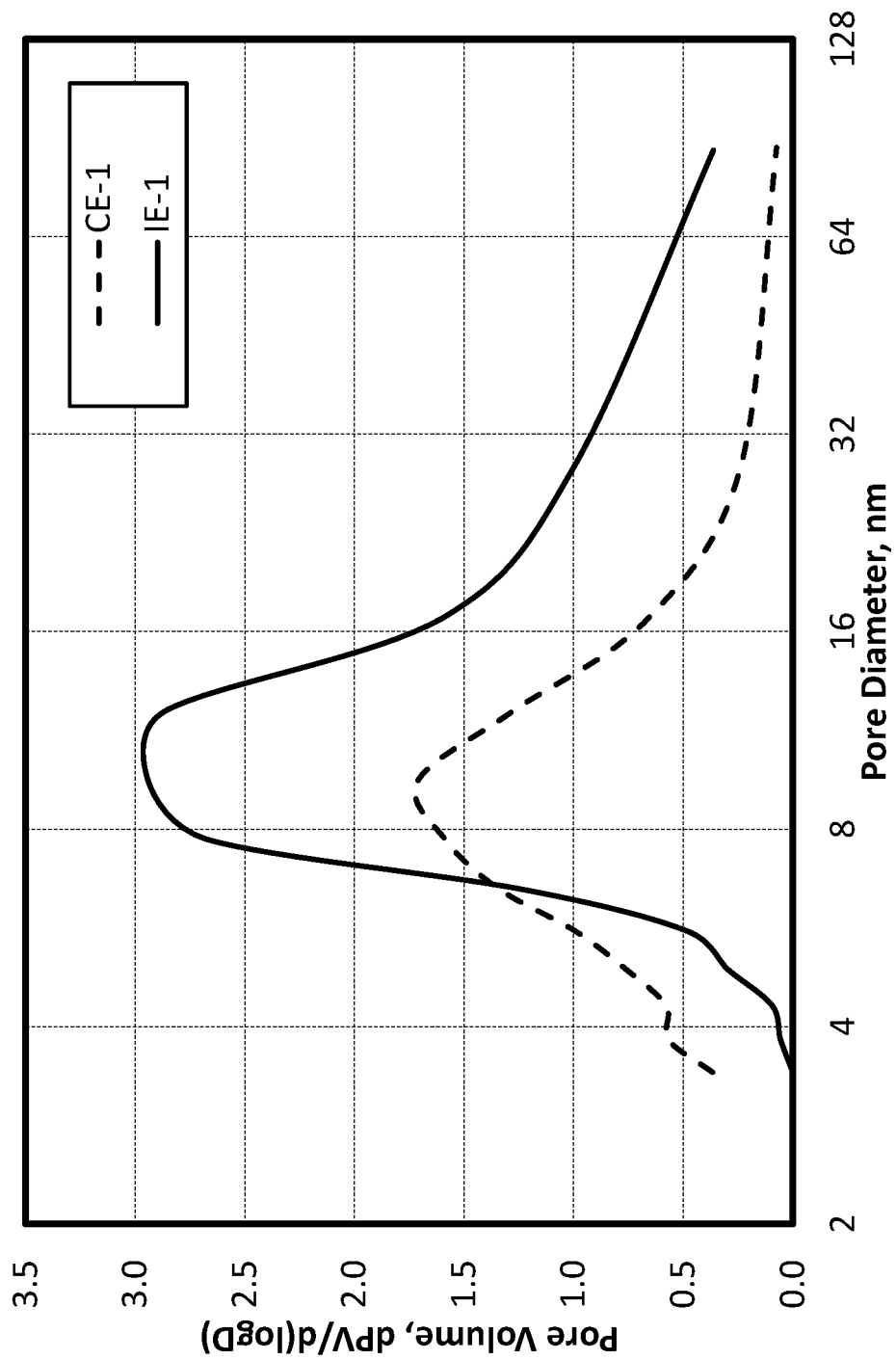
FIG. 1 presents plots of the pore volume distributions as a function of pore diameter (nm) for the silica-coated aluminas of Comparative Example 1 (CE-1) and Inventive Example 1 (IE-1).

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2$^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the compounds, compositions, processes, or methods described herein are contemplated with or without explicit description of the particular combination. Additionally, unless explicitly recited otherwise, any aspect or feature disclosed herein can be combined to describe inventive compounds, compositions, processes, or methods consistent with the present disclosure.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

While compositions and methods/processes are described herein in terms of "comprising" various components or steps, the compositions and methods/processes also can "consist essentially of" or "consist of" the various components or steps, unless stated otherwise. For example, a catalyst composition consistent with aspects of the present invention can comprise; alternatively, can consist essentially of; or alternatively, can consist of; a metallocene compound, a fluorided silica-coated alumina, and a co-catalyst.

The terms "a," "an," "the," etc., are intended to include plural alternatives, e.g., at least one, unless otherwise specified. For instance, the disclosure of "a metallocene compound" or "a comonomer" is meant to encompass one, or mixtures or combinations of more than one, metallocene compound or comonomer, respectively, unless otherwise specified.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "polymer" is used herein generically to include olefin homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from any olefin monomer and comonomer(s) disclosed herein. Similarly, the scope of the term "polymerization" includes homopolymerization, copolymerization, and terpolymerization. Therefore, an ethylene polymer includes ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, unless stated otherwise, and such configurations can include isotactic, syndiotactic, and random symmetries. Moreover, unless stated otherwise, the term "polymer" also is meant to include all molecular weight polymers.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to a fluorided silica-coated alumina. The term "co-catalyst" is used regardless of the actual function of the compound or any chemical mechanism by which the compound may operate.

The term "metallocene" as used herein describes compounds comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands can include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, the metallocene compound, or the fluorided silica-coated alumina, after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, can be used interchangeably throughout this disclosure.

The terms "contacting" and "combining" are used herein to describe compositions, processes, and methods in which the materials or components are contacted or combined together in any order, in any manner, and for any length of time, unless otherwise specified. For example, the materials or components can be blended, mixed, slurried, dissolved, reacted, treated, compounded, or otherwise contacted or combined in some other manner or by any suitable method or technique.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. As a representative example, the total pore volume of a fluorided silica-coated alumina can be in certain ranges in various aspects of this invention. By a disclosure that the pore volume can be in a range from 0.85 to 2 mL/g, the intent is to recite that the pore volume can be any amount in the range and, for example, can include any range or combination of ranges from to 2 mL/g, such as from 0.85 to 1.6 mL/g, from 0.9 to 1.8 mL/g, from 0.9 to 1.5 mL/g, or from 1 to 1.7 mL/g, and so forth. Likewise, all other ranges disclosed herein should be interpreted in a manner similar to this example.

In general, an amount, size, formulation, parameter, range, or other quantity or characteristic is "about" or "approximate" whether or not expressly stated to be such. Whether or not modified by the term "about" or "approximately," the claims include equivalents to the quantities or characteristics.

Although any methods, devices, and materials similar or equivalent to those described herein can be used in the practice or testing of the invention, the typical methods, devices, and materials are herein described.

All publications and patents mentioned herein are incorporated herein by reference in their entirety for the purpose of describing and disclosing, for example, the constructs and methodologies that are described in the publications and patents, which might be used in connection with the presently described invention.

DETAILED DESCRIPTION OF THE INVENTION

Disclosed herein are processes for preparing fluorided silica-coated aluminas and metallocene-based catalyst compositions containing the fluorided silica-coated aluminas. Polymerization processes using the metallocene-based catalyst compositions to produce olefin polymers also are provided.

Beneficially, the fluorided silica-alumina activator-supports have high pore volume and increased porosity, as well as higher adsorptivity for metallocene compounds, enabling significant increases in catalytic activity.

Fluorided Silica-Coated Alumina Activator-Supports

A fluorided silica-coated alumina activator-support encompassed herein can have (or can be characterized by) a bulk density from 0.15 to 0.37 g/mL, a total pore volume from 0.85 to 2 mL/g, a BET surface area from 200 to 500 $m^2/g$, and an average pore diameter from 10 to 25 nm. Another fluorided silica-coated alumina encompassed herein can have (or can be characterized by) a bulk density from 0.15 to 0.37 g/mL, a total pore volume from to 2 mL/g, a BET surface area from 200 to 500 $m^2/g$, and from 80 to 99% of pore volume of the fluorided silica-coated alumina in pores with diameters of greater than 6 nm. These illustrative and non-limiting examples of fluorided silica-coated alumina activator-supports consistent with the present invention also can have any of the properties listed below and in any combination, unless indicated otherwise.

Generally, the fluorided silica-coated alumina can have a bulk density from 0.15 to g/mL. Other representative and non-limiting ranges for the bulk density include from 0.15 to 0.32 g/mL, from 0.17 to 0.3 g/mL, from 0.18 to 0.28 g/mL, or from 0.18 to 0.25 g/mL, and the like. The total pore volume of the fluorided silica-coated alumina can range from 0.85 to 2 mL/g, while the BET surface area can range from 200 to 500 $m^2/g$. In some aspects, the total pore volume can range from 0.85 to 1.6 mL/g; alternatively, from 0.9 to 1.8 mL/g; alternatively, from 0.9 to 1.5 mL/g; or alternatively, from 1 to 1.7 mL/g. Likewise, the BET surface area, in some aspects, can range from 250 to 450 $m^2/g$; alternatively, from 200 to 425 $m^2/g$; or alternatively, from 270 to 425 $m^2/g$.

Beneficially, the fluorided silica-coated alumina activator-support has a significant amount of meso-pores (pores with a pore size greater than or equal to 10 nm in diameter). One test to quantify the significant amount of larger pores is the average pore diameter in nanometers (4000*PV/SA, with PV in mL/g and SA in $m^2/g$). For example, a fluorided silica-coated alumina with a total pore volume of 0.96 mL/g and a total BET surface area of 330 $m^2/g$ translates to an average pore diameter of 11.6 nm. While not limited thereto, the fluorided silica-coated alumina disclosed herein can have an average pore diameter from 10 to 20 nm in one aspect, from 10.5 to 22 nm in another aspect, from 11 to 22 nm in yet another aspect, and from 11 to 19 nm in still another aspect.

Another indicator of the significant amount of larger pores is the percentage of the pore volume in pores with diameters of greater than 6 nm. The fluorided silica-coated alumina can have, for instance, from 80 to 97%, from 82 to 99%, from 82 to 97%, from 83 to 98%, or from 84 to 99%, of the pore volume in pores with diameters of greater than 6 nm.

Another indicator of the amount of larger pores of the fluorided silica-coated alumina is a significant amount of the pore volume in pores with diameters of greater than 20 nm and/or greater than 40 nm. In one aspect, the amount of the pore volume in pores with diameters of greater than 20 nm can fall within a range from 9.5 to 30%, from 10 to 30%, from 10 to 27%, from 10.5 to 28%, or from 11 to 26%, while not being limited thereto. Additionally or alternatively, the fluorided silica-coated alumina can be characterized as having from 3.5 to 15%, from 3.5 to 13%, from 4 to 15%, from 4 to 13%, or from 5 to 15%, of the pore volume in pores with diameters of greater than 40 nm.

Another indicator of the significant amount of larger pores is the amount of pore volume present in pores with diameters of greater than 6 nm. While not being limited thereto, the fluorided silica-coated alumina can have a pore volume of pores with diameters of greater than 6 nm of at least 0.7 mL/g, at least 0.8 mL/g, or at least 0.85 mL/g, with representative ranges including from 0.7 to 1.6 mL/g, from 0.7 to 1.4 mL/g, from 0.75 to 1.5 mL/g, from 0.8 to 1.6 mL/g, or from 0.8 to 1.4 mL/g, and the like. Similarly, the fluorided silica-coated alumina can have a pore volume of pores with diameters of greater than 20 nm of at least 0.09 mL/g or at least 0.1 mL/g, with representative ranges including from 0.09 to mL/g, from 0.09 to 0.34 mL/g, from 0.1 to 0.4 mL/g, from 0.1 to 0.36 mL/g, or from to 0.34 mL/g, and the like.

Referring now to characterizations of the fluorided silica-coated alumina based on surface area, a vast majority of surface area resides in pores with diameters of greater than 6 nm. While not limited thereto, the fluorided silica-coated alumina can have from 65 to 98%, from 65 to 94%, from 65 to 91%, from 68 to 94%, from 70 to 98%, or from 70 to 91%, of surface area in pores with diameters of greater than 6 nm. Additionally or alternatively, the fluorided silica-coated alumina can be characterized as having from 19.5 to 55%, from to 55%, from 20 to 50%, from 21 to 55%, or from 21 to 50%, of the surface area in pores with diameters of greater than 10 nm, although not necessarily limited thereto.

Another indicator of the larger amount of surface area residing in larger pores is the amount of surface area of the fluorided silica-coated alumina in pores having diameters of greater than 6 nm. While not being limited thereto, the fluorided silica-coated alumina can have a surface area of pores with diameters of greater than 6 nm of at least 250 $m^2/g$ or at least 275 $m^2/g$, with representative ranges including from 250 to 475 $m^2/g$, or from 275 to 450 $m^2/g$, and the like. Similarly, the fluorided silica-coated alumina can have a surface area of pores with diameters of greater than 10 nm range of at least 78 $m^2/g$ or at least 85 $m^2/g$, with representative ranges including from 78 to 200 $m^2/g$, or from 85 to 180 $m^2/g$, and the like.

The fluorided silica-coated alumina can have any suitable particle size, as would be recognized by those of skill in the art. Illustrative and non-limiting ranges for the average (d50) particle size of the fluorided silica-coated alumina can include from 30 to 150 microns, from 40 to 100 microns, or from 45 to 85 microns, and the like.

The silica content of the fluorided silica-coated alumina, while not being necessarily limited to, often ranges from 10 to 80 wt. %, based on the weight of the silica-coated alumina. More often, the fluorided silica-coated alumina contains from 20 to 60 wt. % silica in one aspect, from 25 to 55 wt. % silica in another aspect, and from 35 to 45 wt. % silica in yet another aspect. These percentages are based on the weight of silica-coated alumina.

Likewise, while not being limited thereto, the fluorided silica-coated alumina can contain from 0.5 to 18 wt. % F, although any suitable amount case be used. In many instances, the fluorided silica-coated alumina described herein contains from 1 to 13 wt. % F, from 2 to 9 wt. % F, from 3 to 16 wt. % F, or from 3 to 10 wt. % F, and the like. These weight percentages are based on the weight of the fluorided silica-coated alumina.

Catalyst Compositions

The present invention encompasses catalyst compositions comprising a metallocene compound and a fluorided silica-coated alumina activator-support. These catalyst compositions can be utilized to produce polyolefins—homopolymers, copolymers, and the like—for a variety of end-use applications. In aspects of the present invention, it is contemplated that the catalyst composition can contain one metallocene compound (or two or more metallocene compounds). Further, more than one fluorided silica-coated alumina also can be utilized. As a skilled artisan would readily recognize, supporting the metallocene compound(s) on the fluorided silica-coated alumina would not impact the overall pore volume and surface area, the pore volume distribution, and the surface area distribution, thus these features of a supported metallocene catalyst would be effectively the same as those disclosed hereinabove for the fluorided silica-coated alumina (based on the amount of metallocene adsorbed, as illustrated in the example section that follows).

A supported metallocene catalyst in one aspect of this invention can comprise a metallocene compound and a fluorided silica-coated alumina, and the amount of the metallocene compound adsorbed per gram of the fluorided silica-coated alumina can be at least 55 µmol/g or at least 60 µmol/g, with representative ranges including from 55 to 155 µmol/g, from 60 to at least 130 µmol/g, and the like. A supported metallocene catalyst in another aspect of this invention can comprise a metallocene compound and a fluorided silica-coated alumina, and the number of molecules of the metallocene compound adsorbed per nm 2 of surface area of the fluorided silica-coated alumina can be at least 0.1 molecules per nm 2 or at least 0.12 molecules per $nm^2$, with representative ranges include from 0.1 to 0.3 molecules per $nm^2$, from 0.1 to 0.24 molecules per $nm^2$, or from 0.12 to 0.22 molecules per $nm^2$, and the like.

Catalyst compositions of the present invention comprise a metallocene compound and a fluorided silica-coated alumina, and optionally, such catalyst compositions can further comprise one or more than one co-catalyst compound or compounds (suitable co-catalysts, such as organoaluminum compounds, are discussed herein). Thus, a catalyst composition of this invention can comprise a metallocene compound, a fluorided silica-coated alumina, and an organoaluminum compound. Accordingly, a catalyst composition consistent with aspects of the invention can comprise (or consist essentially of, or consist of) a metallocene compound, a fluorided silica-coated alumina, and an organoaluminum compound.

In another aspect of the present invention, a catalyst composition is provided which comprises a metallocene compound, a fluorided silica-coated alumina, and an organoaluminum compound, wherein this catalyst composition is substantially free of aluminoxanes, organoboron or organoborate compounds, ionizing ionic compounds, or combinations thereof; alternatively, substantially free of aluminoxanes; alternatively, substantially free or organoboron or organoborate compounds; or alternatively, substantially free of ionizing ionic compounds. For instance, the catalyst composition can contain less than 500 ppm, less than 100 ppm, less than 10 ppm, or less than 1 ppm, independently, of aluminoxanes, organoboron or organoborate compounds, and ionizing ionic compounds. In these aspects, the catalyst composition has catalyst activity, discussed below, in the absence of these additional materials. For example, a catalyst composition of the present invention can consist essentially of a metallocene compound, a fluorided silica-coated alumina, and an organoaluminum compound, wherein no other materials are present in the catalyst composition which would increase/decrease the activity of the catalyst composition by more than about 10% from the catalyst activity of the catalyst composition in the absence of said materials.

However, in other aspects of this invention, these co-catalysts can be employed. For example, a catalyst composition comprising a metallocene complex and a fluorided silica-coated alumina can further comprise a co-catalyst. Suitable co-catalysts in this aspect can include, but are not limited to, aluminoxane compounds, organoboron or organoborate compounds, ionizing ionic compounds, organoaluminum compounds, organozinc compounds, organomagnesium compounds, organolithium compounds, and the like, or any combination thereof; or alternatively, organoaluminum compounds, organozinc compounds, organomagnesium compounds, organolithium compounds, or any combination thereof. More than one co-catalyst can be present in the catalyst composition.

In particular aspects directed to catalyst compositions containing a co-catalyst and polymerization processes using a co-catalyst, the co-catalyst can comprise an aluminoxane compound (e.g., a supported aluminoxane), an organoboron or organoborate compound, an ionizing ionic compound, an organoaluminum compound, an organozinc compound, an organomagnesium compound, or an organolithium compound, and this includes any combinations of these materials. In one aspect, the co-catalyst can comprise an organoaluminum compound. In another aspect, the co-catalyst can comprise an aluminoxane compound, an organoboron or organoborate compound, an ionizing ionic compound, an organozinc compound, an organomagnesium compound, an organolithium compound, or any combination thereof. In yet another aspect, the co-catalyst can comprise an aluminoxane compound; alternatively, an organoboron or organoborate compound; alternatively, an ionizing ionic compound; alternatively, an organozinc compound; alternatively, an organomagnesium compound; or alternatively, an organolithium compound.

Specific non-limiting examples of suitable organoaluminum compounds can include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, or combinations thereof. Representative and non-limiting examples of aluminoxanes include methylaluminoxane, modified methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, isopentylaluminoxane, neopentylaluminoxane, and the like, or any combination thereof. Representative and non-limiting examples of organoboron/organoborate compounds include N,N-dimethylanilinium tetrakis-(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoro-methyl)phenyl]borate, triphenylcarbenium tetrakis[3,5-bis(trifluoromethyl)phenyl]borate, tris(pentafluorophenyl)boron, tris[3,5-bis(trifluoromethyl)phenyl]boron, and the like, or mixtures thereof.

Examples of ionizing ionic compounds can include, but are not limited to, the following compounds: tri(n-butyl) ammonium tetrakis(p-tolyl)borate, tri(n-butyl) ammonium tetrakis(m-tolyl)borate, tri(n-butyl)ammonium tetrakis(2,4-dimethylphenyl)-borate, tri(n-butyl)ammonium tetrakis(3,5-dimethylphenyl)borate, tri(n-butyl)ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethylphenyl)borate, N,N-dimethylanilinium tetrakis[3,5-bis(trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl) borate, triphenylcarbenium tetrakis[3,5-bis(trifluoromethyl)phenyl] borate, triphenylcarbenium tetrakis(pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoromethyl)phenyl] borate, tropylium tetrakis(pentafluorophenyl) borate, lithium tetrakis(pentafluorophenyl)borate, lithium tetraphenylborate, lithium tetrakis(p-tolyl)borate, lithium tetrakis(m-tolyl)borate, lithium tetrakis(2,4-dim ethylphenyl)borate, lithium tetrakis(3,5-dim ethylphenyl)borate, lithium tetrafluoroborate, sodium tetrakis(pentafluorophenyl)borate, sodium tetraphenylborate, sodium tetrakis(p-tolyl)borate, sodium tetrakis(m-tolyl)borate, sodium tetrakis(2,4-dim ethylphenyl)borate, sodium tetrakis(3,5-dimethylphenyl)borate, sodium tetrafluoroborate, potassium tetrakis(pentafluorophenyl)borate, potassium tetraphenylborate, potassium tetrakis(p-tolyl)borate, potassium tetrakis(m-tolyl)borate, potassium tetrakis(2,4-dim ethylphenyl)borate, potassium tetrakis(3,5-dim ethylphenyl)borate, potassium tetrafluoroborate, lithium tetrakis(pentafluorophenyl)aluminate, lithium tetraphenylaluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis(pentafluorophenyl)aluminate, sodium tetraphenylaluminate, sodium tetrakis(p-tolyl)aluminate, sodium tetrakis(m-tolyl)aluminate, sodium tetrakis(2,4-dimethylphenyl) aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl)aluminate, potassium tetrakis(m-tolyl) aluminate, potassium tetrakis(2,4-dimethylphenyl) aluminate, potassium tetrakis (3,5-dimethylphenyl) aluminate, potassium tetrafluoroaluminate, and the like, or combinations thereof.

Exemplary organozinc compounds which can be used as co-catalysts can include, but are not limited to, dimethylzinc, diethylzinc, dipropylzinc, dibutylzinc, dineopentylzinc, di(trimethyl silyl)zinc, di(tri ethyl silyl)zinc, di(triisoproplysilyl)zinc, di(triphenyl silyl)zinc, di(allyldimethylsilyl)zinc, di(trimethylsilylmethyl)zinc, and the like, or combinations thereof.

Similarly, exemplary organomagnesium compounds can include, but are not limited to, dimethylmagnesium, diethylmagnesium, dipropylmagnesium, dibutylmagnesium, dineopentylmagnesium, di(trimethylsilylmethyl)magnesium, methylmagnesium chloride, ethylmagnesium chloride, propylmagnesium chloride, butylmagnesium chloride, neopentylmagnesium chloride, trimethylsilylmethylmagnesium chloride, methylmagnesium bromide, ethylmagnesium bromide, propylmagnesium bromide, butylmagnesium bromide, neopentylmagnesium bromide, trimethylsilylmethylmagnesium bromide, methylmagnesium iodide, ethylmagnesium iodide, propylmagnesium iodide, butylmagnesium iodide, neopentylmagnesium iodide, trimethylsilylmethylmagnesium iodide, methylmagnesium ethoxide, ethylmagnesium ethoxide, propylmagnesium ethoxide, butylmagnesium ethoxide, neopentylmagnesium ethoxide, trimethylsilylmethylmagnesium ethoxide, methylmagnesium propoxide, ethylmagnesium propoxide, propylmagnesium propoxide, butylmagnesium propoxide, neopentylmagnesium propoxide, trimethylsilylmethylmagnesium propoxide, methylmagnesium phenoxide, ethylmagnesium phenoxide, propylmagnesium phenoxide, butylmagnesium phenoxide, neopentylmagnesium phenoxide, trimethylsilylmethylmagnesium phenoxide, and the like, or any combinations thereof.

Likewise, exemplary organolithium compounds can include, but are not limited to, methyllithium, ethyllithium, propyllithium, butyllithium (e.g., t-butyllithium), neopentyllithium, trimethylsilylmethyllithium, phenyllithium, tolyllithium, xylyllithium, benzyllithium, (dimethylphenyl)methyllithium, allyllithium, and the like, or combinations thereof.

Co-catalysts that can be used in the catalyst compositions and polymerization processes of this invention are not limited to the co-catalysts described above. Other suitable co-catalysts are well known to those of skill in the art including, for example, those disclosed in U.S. Pat. Nos. 3,242,099, 4,794,096, 4,808,561, 5,576,259, 5,807,938, 5,919,983, 7,294,599 7,601,665, 7,884,163, 8,114,946, and 8,309,485.

Any suitable metallocene compound can be used in the catalyst composition. For example, the metallocene component of the catalyst systems provided herein can, in some aspects, comprise an unbridged metallocene; alternatively, an unbridged zirconium or hafnium based metallocene compound; alternatively, an unbridged zirconium or hafnium based metallocene compound containing two cyclopentadienyl groups, two indenyl groups, or a cyclopentadienyl and an indenyl group; alternatively, an unbridged zirconium based metallocene compound containing two cyclopentadienyl groups, two indenyl groups, or a cyclopentadienyl and an indenyl group. These cyclopentadienyl groups and indenyl groups, independently, can be unsubstituted or can be substituted with any suitable substituent (one or more than one). Illustrative and non-limiting examples of unbridged metallocene compounds (e.g., with zirconium or hafnium) that can be employed in catalyst systems consistent with aspects of the present invention are described in U.S. Pat. Nos. 7,199,073, 7,226,886, 7,312,283, and 7,619,047.

In other aspects, the metallocene component of the catalyst compositions provided herein can comprise a bridged metallocene compound, e.g., with titanium, zirconium, or hafnium, such as a bridged zirconium or hafnium based metallocene compound with a fluorenyl group; or alternatively, a bridged zirconium or hafnium based metallocene compound with a cyclopentadienyl group and a fluorenyl group. These cyclopentadienyl groups and fluorenyl groups, independently, can be unsubstituted or can be substituted with any suitable substituent (one or more than one). For instance, such bridged metallocenes can contain an alkenyl substituent (e.g., a terminal alkenyl) on the bridging group, on a cyclopentadienyl-type group (e.g., a cyclopentadienyl group or a fluorenyl group), or on the bridging group and the cyclopentadienyl-type group. In some aspects, the metallocene catalyst component can comprise a bridged zirconium or hafnium based metallocene compound with a fluorenyl group, and an aryl group on the bridging group; alternatively, a bridged zirconium or hafnium based metallocene compound with a cyclopentadienyl group and fluorenyl group, and an aryl group on the bridging group; alternatively, a bridged zirconium based metallocene compound with a fluorenyl group, and an aryl group on the bridging group; or alternatively, a bridged hafnium based metallocene compound with a fluorenyl group, and an aryl group on the bridging group. In these and other aspects, the aryl group on the bridging group can be a phenyl group. Optionally, these bridged metallocenes can contain an alkenyl substituent (e.g., a terminal alkenyl) on the bridging group, on a cyclopentadienyl-type group, or on both the bridging group and the cyclopentadienyl group. Illustrative and non-limiting examples of bridged metallocene compounds (e.g., with zirconium or hafnium) that can be employed in catalyst systems consistent with aspects of the present invention are described in U.S. Pat. Nos. 7,026,494, 7,041,617, 7,226,886, 7,312,283, 7,517,939, and 7,619,047.

The catalyst composition can be produced in any manner, such as by contacting the metallocene compound, the fluorided silica-coated alumina, and the co-catalyst (if used) in any order or sequence.

Generally, the weight ratio of co-catalyst (e.g., an organoaluminum compound) to fluorided silica-coated alumina can be in a range from 10:1 to 1:1000. If more than one co-catalyst compound and/or more than one fluorided silica-coated alumina are employed, this ratio is based on the total weight of each respective component. In another aspect, the weight ratio of the co-catalyst to the fluorided silica-coated alumina can be in a range from 3:1 to 1:500, or from 1:10 to 1:350.

In some aspects of this invention, the weight ratio of metallocene complex to the fluorided silica-coated alumina can be in a range from 1:1 to 1:1,000,000. If more than one metallocene compound and/or more than one fluorided silica-coated alumina is/are employed, this ratio is based on the total weights of the respective components. In another aspect, this weight ratio can be in a range from 1:5 to 1:100,000, or from 1:10 to 1:10,000. Yet, in another aspect, the weight ratio of the metallocene to the fluorided silica-coated alumina can be in a range from 1:20 to 1:1000.

Catalyst compositions of the present invention generally have a catalyst activity greater than 2,000 grams, greater than 3,000 grams, greater than 4,000 grams, greater than grams, etc., of ethylene polymer (homopolymer or copolymer, as the context requires) per gram of the fluorided silica-coated alumina per hour (abbreviated g/g/hr). In another aspect, the catalyst activity can range from 3,000 to 20,000, from 4,000 to 15,000, or from 4,000 to 9,000 grams of polyethylene per gram of the fluorided silica-coated alumina per hour (g/g/hr). These activities are measured under slurry polymerization conditions, with a triisobutylaluminum co-catalyst, using isobutane as the diluent, at a polymerization temperature of 75 to 100° C. (e.g., 95° C.) and a reactor pressure of 300 (2.07 MPa) to 500 psig (3.45 MPa) (e.g., 400 psig (2.76 MPa)). Additionally, an excess of the metallocene compound in the catalyst composition can be used (e.g., 1-(methyl)-1-(3-butenyl)-1-(cyclopentadienyl)-1-(2,7-di-tert-butylfluorenyl) methane zirconium dichloride).

Additionally or alternatively, catalyst compositions of the present invention generally have a catalyst activity greater than 100,000 grams, greater than 150,000 grams, greater than 200,000 grams, etc., of ethylene polymer (homopolymer or copolymer, as the context requires) per gram of the metallocene compound per hour (abbreviated g/g/hr). In another aspect, the catalyst activity may range from 100,000 to 1,000,000, from 150,000 to 600,000, or from 200,000 to 500,000 g/g/hr. These activities are measured under slurry polymerization conditions, with a triisobutylaluminum co-catalyst, using isobutane as the diluent, at a polymerization temperature of 75 to 100° C. (e.g., 95° C.) and a reactor pressure of 300 (2.07 MPa) to 500 psig (3.45 MPa) (e.g., 400 psig (2.76 MPa)).

Polymerization Processes

Olefin polymers (e.g., ethylene polymers) can be produced from the disclosed catalyst compositions using any suitable polymerization process using various types of polymerization reactors, polymerization reactor systems, and polymerization reaction conditions. A polymerization process can comprise contacting any catalyst composition disclosed herein with an olefin monomer and an optional olefin comonomer in a polymerization reactor system under polymerization conditions to produce an olefin polymer. This invention also encompasses any olefin polymers (e.g., ethylene polymers) produced by the polymerization processes disclosed herein.

As used herein, a "polymerization reactor" includes any polymerization reactor capable of polymerizing olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof; or alternatively, the polymerization reactor system can comprise a slurry reactor, a gas-phase reactor, a solution reactor, or a combination thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymer resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608. Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously or pulsed).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant (such as within +/−20%, +/−10%, or +/−5%), for example, for the production of a particular grade of the olefin polymer (or ethylene polymer). A suitable polymerization temperature can be any temperature below the de-polymerization temperature according to the Gibbs Free energy equation. Typically, this includes from 60° C. to 280° C., for example, or from 60° C. to 120° C., depending upon the type of polymerization reactor(s). In some reactor systems, the polymerization temperature generally can be within a range from 70° C. to 105° C., or from 75° C. to 100° C.

Suitable pressures will also vary according to the reactor and polymerization type. The pressure for liquid phase polymerizations in a loop reactor is typically less than 1000 psig (6.9 MPa). Pressure for gas phase polymerization is usually at 200 to 500 psig (1.4 MPa to 3.4 MPa). High pressure polymerization in tubular or autoclave reactors is generally run at 20,000 to 75,000 psig (138 to 517 MPa). Polymerization reactors can also be operated in a supercritical region occurring at generally higher temperatures and pressures. Operation above the critical point of a pressure/temperature diagram (supercritical phase) can offer advantages to the polymerization reaction process.

Olefin monomers that can be employed with the catalyst compositions and in the polymerization processes of this invention typically can include olefin compounds having from 2 to 30 carbon atoms per molecule and having at least one olefinic double bond, such as ethylene or propylene. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene (e.g., to produce a polypropylene homopolymer or a propylene-based copolymer).

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin or a $C_3$-$C_{20}$ alpha-olefin). According to one aspect of this invention, the olefin monomer used in the polymerization process can comprise ethylene. In this aspect, the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

Polymers and Articles

Olefin polymers encompassed herein can include any polymer produced from any olefin monomer and optional comonomer(s) described herein. For example, the olefin polymer can comprise an ethylene homopolymer, an ethylene copolymer (e.g., ethylene/α-olefin, ethylene/1-butene, ethylene/1-hexene, ethylene/1-octene, etc.), a propylene homopolymer, a propylene copolymer, an ethylene terpolymer, a propylene terpolymer, and the like, including any combinations thereof. In one aspect, the olefin polymer can be (or can comprise) an ethylene/1-butene copolymer, an ethylene/1-hexene copolymer, or an ethylene/1-octene copolymer, while in another aspect, the olefin polymer can be (or can comprise) an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the olefin polymers (e.g., ethylene polymers) of this invention, whose typical properties are provided below.

The densities of ethylene-based polymers disclosed herein often are greater than or equal to 0.90 g/cm$^3$, and less than or equal to 0.97 g/cm$^3$. Yet, in particular aspects, the density can be in a range from 0.91 to 0.965 g/cm$^3$, from 0.91 to 0.93 g/cm$^3$, from 0.92 to 0.96 g/cm$^3$, from 0.93 to 0.955 g/cm$^3$, or from 0.94 to 0.955 g/cm$^3$. While not being limited thereto, the ethylene polymer can have a high load melt index (HLMI) in a range from 0 to 100 g/10 min; alternatively, from 1 to 80 g/10 min; alternatively, from 2 to 40 g/10 min; alternatively, from 2 to 30 g/10 min; alternatively, from 1 to 20 g/10 min; or alternatively, from 50 to 100 g/10 min. In an aspect, ethylene polymers described herein can have a ratio of Mw/Mn, or the polydispersity index, in a range from 2 to 40, from 5 to 40, from 7 to 25, from 8 to 15, from 2 to 10, from 2 to 6, or from 2 to 4. Additionally or alternatively, the ethylene polymer can have a weight-average molecular weight (Mw) in a range from 75,000 to 700,000, from 75,000 to 200,000, from 100,000 to 500,000, from 150,000 to 350,000, or from 200,000 to 320,000 g/mol. Moreover, the olefin polymers can be produced with a single or dual metallocene catalyst system containing zirconium and/or hafnium. In such instances, the olefin polymer or ethylene polymer can contain no measurable amount of Mg, V, Ti, and Cr, i.e., less than 0.1 ppm by weight. In further aspects, the olefin polymer or ethylene polymer can contain, independently, less than 0.08 ppm, less than 0.05 ppm, or less than 0.03 ppm, of Mg, V, Ti, and Cr.

An illustrative and non-limiting example of a particular ethylene polymer (e.g., an ethylene/α-olefin copolymer) encompassed herein—produced using the supported fluorided silica-coated aluminas with the porosity and other attributes disclosed herein—can have a melt index (MI) in a range from 0.1 to 10 g/10 min and a density in a range from 0.91 to 0.96 g/cm$^3$, and the ethylene polymer can contain from 70 to 270 ppm solid oxide and from 2 to 18 ppm fluorine. The fluorine content is based on the elemental weight of F, and generally, the fluorine is from an inorganic source used in the preparation of the fluorided silica-coated alumina. Due to the unexpectedly high catalytic activity and catalyst productivity of the disclosed fluorided silica-coated aluminas, the resulting ethylene polymer has beneficially low amounts of catalyst residue.

The melt index of the ethylene polymer ranges from 0.1 to 10 g/10 min, but more often, the melt index falls within a range from 0.3 to 8, from 0.5 to 5, from 0.8 to 3, or from to 2 g/10 min, and the like. The density of the ethylene-based polymer often can range from 0.91 to 0.96 or from 0.915 to 0.958 g/cm³. In one aspect, the density can range from 0.916 to 0.956, from 0.917 to 0.954 in another aspect, and from 0.915 to 0.952 g/cm 3 in yet another aspect.

In an aspect, the ethylene polymer can have a Mw in a range from 25,000 to 400,000, from 40,000 to 300,000, from 50,000 to 250,000, or from 80,000 to 200,000 g/mol. Additionally or alternatively, the ethylene polymers can have a ratio of Mw/Mn in a range from 2 to 25, from 2.1 to 20, from 2.3 to 20, from 2 to 5, or from 8 to 25, and the like. The ethylene polymer can have a unimodal molecular weight distribution, such as may be produced using a single metallocene catalyst, and thus would generally have a narrow MWD. Alternatively, the ethylene polymer can have a bimodal molecular weight distribution, such as may be produced using two metallocene catalysts, and thus would generally have a broad MWD.

As discussed herein, the ethylene polymer can be produced with a metallocene catalyst, therefore, chromium and Ziegler-Natta catalyst systems are not required. Therefore, the ethylene polymer can contain no measurable amount of magnesium, vanadium, titanium, or chromium (catalyst residue), i.e., less than 0.1 ppm by weight. In some aspects, the ethylene polymer can contain, independently, less than 0.08 ppm, less than ppm, or less than 0.03 ppm, of magnesium (or vanadium, or titanium, or chromium). The amounts of these elements can be determined by ICP analysis on a PerkinElmer Optima 8300 instrument. Polymer or article samples can be ashed in a Thermolyne furnace with sulfuric acid overnight, followed by acid digestion in a HotBlock with HCl and $HNO_3$ (3:1 v:v).

Instead, the ethylene polymer typically contains from 70 to 270 ppm solid oxide (such as silica-coated alumina) and from 2 to 18 ppm fluorine (by weight). Other illustrative ranges for the fluorine content of the ethylene polymer include, but are not limited to, from 2 to 16 ppm, from 2 to 14 ppm, from 2 to 12 ppm, from 2 to 10 ppm, from 3 to 16 ppm, from 3 to 12 ppm, from 4 to 12 ppm, or from 4 to 10 ppm of fluorine. Other illustrative ranges for the solid oxide content of the ethylene polymer include, but are not limited to, from 70 to 250 ppm, from 100 to 250 ppm, from 100 to 200 ppm, from 100 to 150 ppm, from 120 to 250 ppm, from 120 to 200 ppm, or from 120 to 170 ppm of solid oxide. The solid oxide content of the polymer is quantified by an ash test, discussed hereinbelow. While not required, the solid oxide can contain silica and alumina in any suitable relative amount, and illustrative weight ratios of silica:alumina can include from 20:80 to 80:20, from 20:80 to from 25:75 to 55:45, or from 35:65 to 45:55, and so forth. The ethylene polymer also contains residual metal from the metallocene compound, such as zirconium and/or hafnium (or titanium, if used). Generally, the ethylene polymer can contain from 0.5 to 5 ppm, from 0.5 to 4 ppm, from 0.5 to 3 ppm, from 0.6 to 5 ppm, from 0.6 to 4 ppm, from 0.6 to 3 ppm, from 0.7 to 4 ppm, or from 0.7 to 2.5 ppm of zirconium (or hafnium, or titanium).

Polymers of ethylene, whether homopolymers, copolymers, and so forth, can be formed into various articles of manufacture. Articles which can comprise polymers of this invention include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in Modern Plastics Encyclopedia, Mid-November 1995 Issue, Vol. 72, No. 12; and Film Extrusion Manual—Process, Materials, Properties, TAPPI Press, 1992. In some aspects of this invention, an article of manufacture can comprise any of olefin polymers (or ethylene polymers) described herein, and the article of manufacture can be or can comprise a film (e.g., a blown film), a pipe, or a molded product (e.g., a blow molded product).

Preparing Fluorided Silica-Coated Aluminas

A process for producing a fluorided silica-coated alumina activator-support is described herein. This process can comprise (or consist essentially of, or consist of) contacting a fluoriding agent with a silica-coated alumina to produce the fluorided silica-coated alumina. The silica-coated alumina, prior to being combined with the fluoriding agent, has (or is characterized by) the following properties: a bulk density from 0.15 to 0.37 g/mL, a total pore volume from 1.1 to 2.5 mL/g, a BET surface area from 250 to 600 m²/g, and an average pore diameter from 10 to 25 nm. Generally, the features of this process (e.g., the fluoriding agent, the silica-coated alumina and its characteristics, and the fluorided silica-coated alumina and its characteristics, among others) are independently described herein, and these features can be combined in any combination to further describe the disclosed process. Moreover, other process steps can be conducted before, during, and/or after any of the steps listed in the disclosed process, unless stated otherwise. Additionally, fluorided silica-coated alumina activator-supports produced in accordance with the disclosed process are within the scope of this disclosure and are encompassed herein.

Typically, the silica-coated alumina starting material has a bulk density from 0.15 to 0.37 g/mL. Other representative and non-limiting ranges for the bulk density include from to 0.32 g/mL, from 0.17 to 0.3 g/mL, from 0.18 to 0.28 g/mL, or from 0.18 to 0.25 g/mL, and the like. The total pore volume of the silica-coated alumina can range from 1.1 to 2.5 mL/g, while the BET surface area can range from 250 to 600 m²/g. In some aspects, the total pore volume can range from 1.2 to 2.2 mL/g; alternatively, from 1.3 to 2.4 mL/g; alternatively, from 1.4 to 2 mL/g; or alternatively, from 1.3 to 1.8 mL/g. Likewise, the BET surface area, in some aspects, can range from 300 to 550 m²/g; alternatively, from 300 to 500 m²/g; or alternatively, from 325 to 475 m²/g.

The silica-coated alumina has a significant amount of larger pores, and one particular measurable parameter is the average pore diameter in nanometers (4000*PV/SA, with PV in mL/g and SA in m²/g). For example, a silica-coated alumina with a total pore volume of 1.6 mL/g and a total BET surface area of 410 m²/g translates to an average pore diameter of nm. While not limited thereto, the silica-coated alumina starting material can have an average pore diameter from 10 to 20 nm in one aspect, from 11 to 19 nm in another aspect, from 12 to 20 nm in yet another aspect, and from 12 to 18 nm in still another aspect.

The silica-coated alumina can contain any suitable amount of silica, based on the weight of the silica-coated alumina. Representative ranges include from 10 to 80 wt. % silica, from 20 to 60 wt. % silica, from 25 to 55 wt. % silica, or from 35 to 45 wt. % silica, and the like.

While not limited thereto, the process to produce the fluorided silica-coated alumina activator-support can be performed by contacting the fluoriding agent and the silica-coated alumina in water to form an aqueous mixture containing the fluorided silica-coated alumina. The order in which the components are combined to produce the aqueous mixture is not particularly limited. In one aspect, for instance, the fluoriding agent can be contacted first with water, and then the silica-coated alumina can be introduced, while in another aspect, the silica-coated alumina can be contacted first with water, and then the fluoriding agent can be introduced. Yet, in another aspect, these components can be contacted substantially contemporaneously, which in this context, means that the fluoriding agent, the silica-coated alumina, and water are contacted together as soon as commercially practicable, such as within 15 min, within 5 min, or within 1 min, of two of the components being contacted (e.g., water and either the fluoriding agent or the silica-coated alumina).

Any suitable fluoriding agent or fluorine-containing compound can be used to produce the fluorided silica-coated alumina. Illustrative and non-limiting examples of the fluoriding agent include hydrogen fluoride (HF), ammonium bifluoride ($NH_4HF_2$), triflic acid ($CF_3SO_3H$), tetrafluoroboric acid ($HBF_4$), hexafluorosilicic acid ($H_2SiF_6$), hexafluorophosphoric acid ($HPF_6$), zinc tetrafluoroborate ($Zn(BF_4)_2$), and the like. Combinations of two or more fluoriding agents can be used, if desired. In an aspect, the fluoriding agent can comprise (or consist essentially of, or consist of) hydrogen fluoride (HF); alternatively, ammonium bifluoride ($NH_4HF_2$); alternatively, triflic acid ($CF_3SO_3H$); alternatively, tetrafluoroboric acid ($HBF_4$); alternatively, hexafluorosilicic acid ($H_2SiF_6$); alternatively, hexafluorophosphoric acid ($HPF_6$); or alternatively, zinc tetrafluoroborate ($Zn(BF_4)_2$).

The fluoriding agent and the silica-coated alumina can be contacted or combined at any suitable pH, and at a variety of temperatures and time periods. Generally, ambient temperatures are conveniently used, and high temperatures are typically avoided, in order to prevent gaseous fluorine compounds from being released.

The process to produce the fluorided silica-coated alumina activator-support can further comprise a step of drying the fluorided silica-coated alumina, and any suitable technique can be utilized. For instance, excess liquid can be removed from the fluorided silica-coated alumina (e.g., draining, filtering, decanting, pressing, centrifuging, etc.), and the wet fluorided silica-coated alumina can be subjected to a wide range of drying times, drying temperatures, and drying pressures. For example, the drying time can range from 15 min to 48 hr, from 30 min to 24 hr, or from 1 to 12 hr, and the drying temperature can range from 50° C. to 300° C., from 95° C. to 300° C., or from 100° C. to 275° C. The drying pressure can be at or around atmospheric pressure, but in many instances, the drying step can be conducted under vacuum conditions at any suitable sub-atmospheric pressure, such as less than 100 torr (13.3 kPa), less than 50 (6.67 kPa) torr, or less than 10 torr (1.33 kPa).

Various types of dryer devices can be used for the drying step, such as tray dryers, rotary dryers, fluidized bed dryers, and spray dryers, although not limited thereto. In a particular aspect of this invention, the drying step comprises spray drying the (wet) fluorided silica-coated alumina (e.g., a slurry or suspension of the fluorided silica-coated alumina in water) to a dried particulate or powder form. For spray drying, the drying times are different from those described above with drying times of less than 30 min, less than 20 min, less than min, less than 5 min, or even less than 1 min.

Optionally, after drying, the fluorided silica-coated alumina can be calcined, which can be conducted at a variety of temperatures and time periods. Typical peak calcining temperatures often fall within a range from 400° C. to 1000° C., such as from 400° C. to 900° C., from 500° C. to 800° C., or from 550° C. to 700° C. In these and other aspects, these temperature ranges also are meant to encompass circumstances where the calcination step is conducted at a series of different temperatures (e.g., an initial calcination temperature, a peak calcination temperature), instead of at a single fixed temperature, falling within the respective ranges, wherein at least one temperature is within the respective ranges.

The duration of the calcining step is not limited to any particular period of time. Hence, the calcining step can be conducted, for example, in a time period ranging from as little as 30-45 min to as long as 36-48 hr, or more. The appropriate calcining time can depend upon, for example, the initial/peak calcining temperature, among other variables. Generally, however, the calcining step can be conducted in a time period that can be in a range from 30 min to 48 hr, such as, for example, from 1 hr to 24 hr, from 1 hr to 12 hr, from 2 hr to 12 hr, or from 2 hr to 8 hr.

The calcining step can be conducted in a calcining gas stream that comprises (or consists essentially of, or consists of) an inert gas (e.g., nitrogen), oxygen, air, or any mixture or combination thereof. In some aspects, the calcining gas stream can comprise air, while in other aspects, the calcining gas stream can comprise a mixture of air and nitrogen. Yet, in certain aspects, the calcining gas stream can be an inert gas, such as nitrogen and/or argon.

The calcining step can be conducted using any suitable technique and equipment, whether batch or continuous. For instance, the calcining step can be performed in a belt calciner or, alternatively, a rotary calciner. In some aspects, the calcining step can be performed in a batch or continuous calcination vessel comprising a fluidized bed. As would be recognized by those of skill in the art, other suitable techniques and equipment can be employed for the calcining step, and such techniques and equipment are encompassed herein.

The fluorided silica-coated alumina produced by the disclosed process can have any of the properties or features disclosed hereinabove, e.g., a bulk density from 0.15 to 0.37 g/mL, a total pore volume from 0.85 to 2 mL/g, a BET surface area from 200 to 500 m²/g, an average pore diameter from 10 to 25 nm, from 80 to 99% of the pore volume in pores with diameters of greater than 6 nm, and the like. Further, the fluorided silica-coated alumina can be produced with any targeted amount of fluorine, such as from 0.5 to 18 wt. % F, from 1 to 13 wt. % F, from 2 to 9 wt. % F, from 3 to 16 wt. % F, or from 3 to 10 wt. % F, based on the weight of the fluorided silica-coated alumina.

EXAMPLES

The invention is further illustrated by the following examples, which are not to be construed in any way as imposing limitations to the scope of this invention. Various other aspects, modifications, and equivalents thereof, which after reading the description herein, can suggest themselves to one of ordinary skill in the art without departing from the spirit of the present invention or the scope of the appended claims.

For silica-coated alumina and fluorided silica-coated alumina characterization, about grams of sample were degassed in a physisorption tube, using a Quantachrome Instruments NOVATOUCH ° Surface Area and Pore Volume Analyzer. To prevent portions of the fine particles from boiling up to a region of the sample tube not in the heated zone, the pressure was reduced gradually, and the temperature was increased stepwise. The pressure was initially reduced from ambient to 1 mm Hg, at a controlled rate of 5 mm Hg/s, while holding the samples at 30° C. After reaching sufficient vacuum (~0.1 mm Hg), the temperature was increased to 80° C. and held for 30 min, then to 150° C. and held for 30 min, then to 250° C. and held for 720 min, with the final vacuum reaching a pressure of about 1 Millitorr. After cooling to ambient, the samples were backfilled with nitrogen and analyzed on the same physisorption instrument. Approximately 39 adsorption points were collected to construct an isotherm, and software packages included with the instrument were used to determine surface areas, pore volumes, and to generate pore size distribution curves. Surface areas were determined using the BET method (Brunauer, *J. Am Chem. Soc.*, 1938, 60, 309), from adsorption isotherm points having P/Po values from 0.0 to 0.2. Pore volume values were calculated from the isotherm point having a P/Po value closest to 0.982. Pore size distributions were generated from desorption isotherm data using the BJH method (*J. Am. Chem. Soc.*, 1951, 73, 373), with thickness curves generated using the Halsey equation (*J. Chem. Phys.*, 1948, 16, 931). Total pore volumes were determined in accordance with Halsey (*J. Chem. Phys.*, 1948, 16, 931).

Bulk density measurements were determined in accordance with ASTM D6683-19. The d50 particle size, or median or average particle size, refers to the particle size for which 50% of the sample has a smaller size and 50% of the sample has a larger size. Particle size distributions (inclusive of d10, d50, and d90) were determined using laser diffraction in accordance with ISO 13320.

Melt rheological characterizations were performed as follows. Small-strain (less than 10%) oscillatory shear measurements were performed on an ANTON PAAR® MCR rheometer using parallel-plate geometry. All rheological tests were performed at 190° C. The complex viscosity $|\eta^*|$ versus frequency (w) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a (CY-a parameter). The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein: $|\eta^*(\omega)|$=magnitude of complex shear viscosity;
$\eta_0$=zero shear viscosity;
$\tau_\eta$=viscous relaxation time (Tau($\eta$));
a="breadth" parameter (CY-a parameter);
n=fixes the final power law slope, fixed at 2/11; and
$\omega$=angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987).

Melt index (MI, g/10 min) can be determined in accordance with ASTM D1238 at 190° C. with a 2,160 gram weight. Density can be determined in grams per cubic centimeter (g/cm$^3$) on a compression molded sample, cooled at 15° C. per minute, and conditioned for hours at room temperature in accordance with ASTM D1505 and ASTM D4703.

Molecular weights and molecular weight distributions can be obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) is set at 1 mL/min, and polymer solution concentrations are in the range of 1.0-1.5 mg/mL, depending on the molecular weight. Sample preparation is conducted at 150° C. for nominally 4 hr with occasional and gentle agitation, before the solutions are transferred to sample vials for injection. An injection volume of about 400 µL is used. The integral calibration method is used to deduce molecular weights and molecular weight distributions using a Chevron Phillips Chemical Company's HDPE polyethylene resin, MARLEX® BHB5003, as the broad standard. An integral table of the broad standard is pre-determined in a separate experiment with SEC-MALS. Mn is the number-average molecular weight, Mw is the weight-average molecular weight, Mz is the z-average molecular weight, My is the viscosity-average molecular weight, and Mp is the peak molecular weight (location, in molecular weight, of the highest point of the molecular weight distribution curve).

Herein, the ASTM ash content of the polymer (measured by ASTM D5630-13, procedure B) encompasses the amount of solid oxide (e.g., silica-coated alumina), metallocene transition metal, and fluorine. Since the metallocene transition metal and fluorine are minor portions of the ash content, the ash content is very close to the solid oxide content, but solid oxide content herein equals ash content minus metallocene transition metal content and minus fluorine content.

Metal content, such as from the transition metal of the metallocene compound, can be determined by ICP analysis on a PerkinElmer Optima 8300 instrument. Polymer or article samples can be ashed in a Thermolyne furnace with sulfuric acid overnight, followed by acid digestion in a HotBlock with HCl and HNO$_3$ (3:1 v:v).

Fluoride content was determined by direct weight of the fluoride compound added. Additionally, fluoride content can be determined by X-ray fluorescence, using calibrated samples of known fluoride content. In all cases, the fluoride added remained on the support after calcination, indicating no loss due to evaporation.

Comparative and Inventive Examples 1-2

Two silica-coated alumina supports were obtained from Sasol Olefins & Surfactants GmbH under the designations of Siral® 40 (Comparative Example 1, CE-1) and Siral® 40 HPV (Inventive Example 1, LE-1), and each contained 40 wt. % silica and 60 wt. % alumina, based on the dry weight composition. Both supports were then treated with an aqueous solution of hydrofluoric acid to yield approximately 5 wt. % fluorine based on the dry weight of the support. The particles were dried, yielding a white powder. A 10-g sample of each powder product was then calcined in dry air in a fluidized bed at 600° C. for three hr, cooled to room temperature, and flushed with dry nitrogen for 30 min. The fluorided silica-coated alumina powder product (Comparative Example 2 (CE-2) and Inventive Example 2 (IE-2)) were stored under nitrogen for later use.

Figure 2:
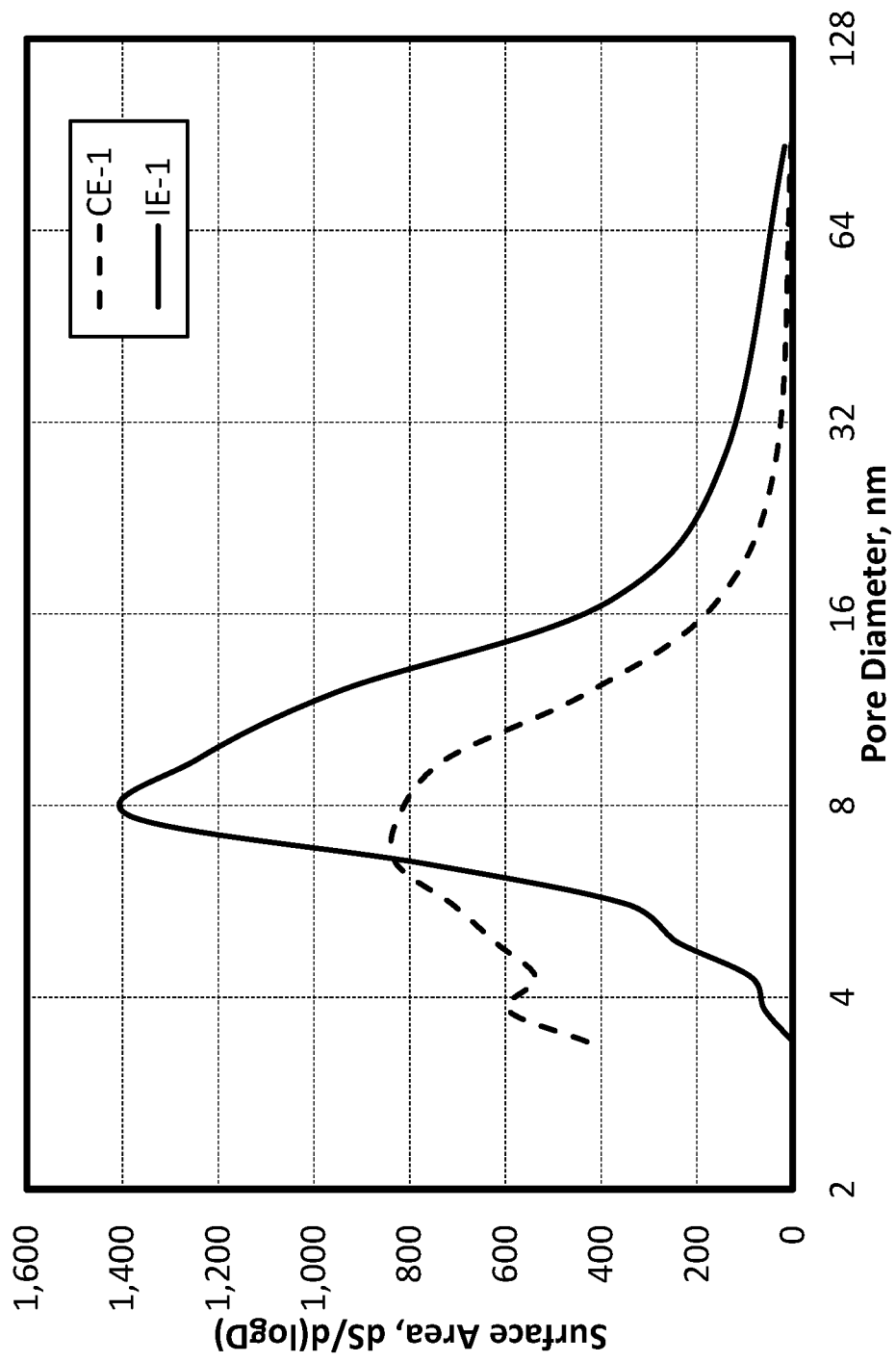
FIG. 2 presents plots of the surface area distributions as a function of pore diameter (nm) for the silica-coated aluminas of CE-1 and IE-1.
Figure 3:
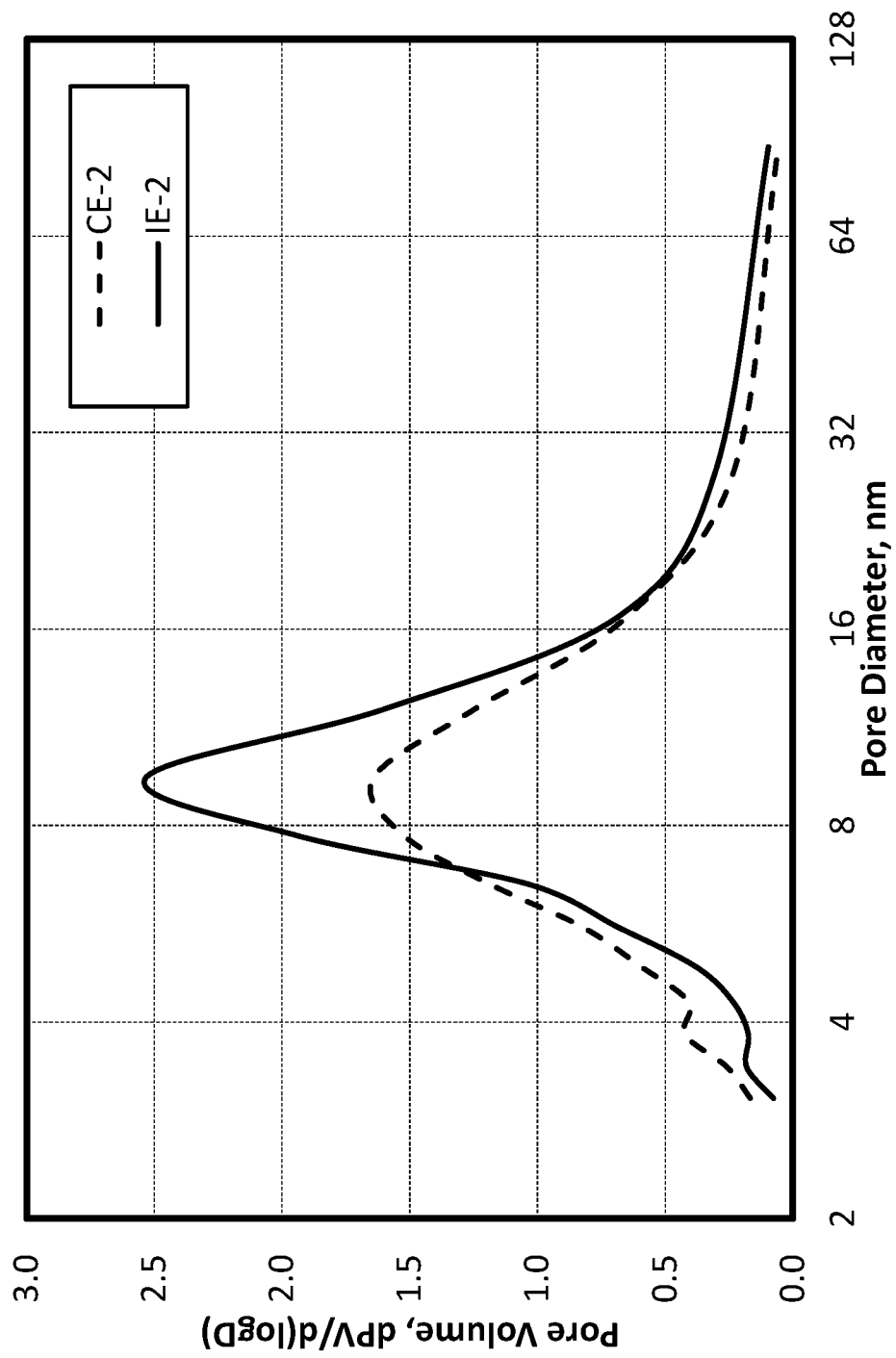
FIG. 3 presents plots of the pore volume distributions as a function of pore diameter (nm) for the fluorided silica-coated aluminas of Comparative Example 2 (CE-2) and Inventive Example 2 (IE-2).
Figure 4:
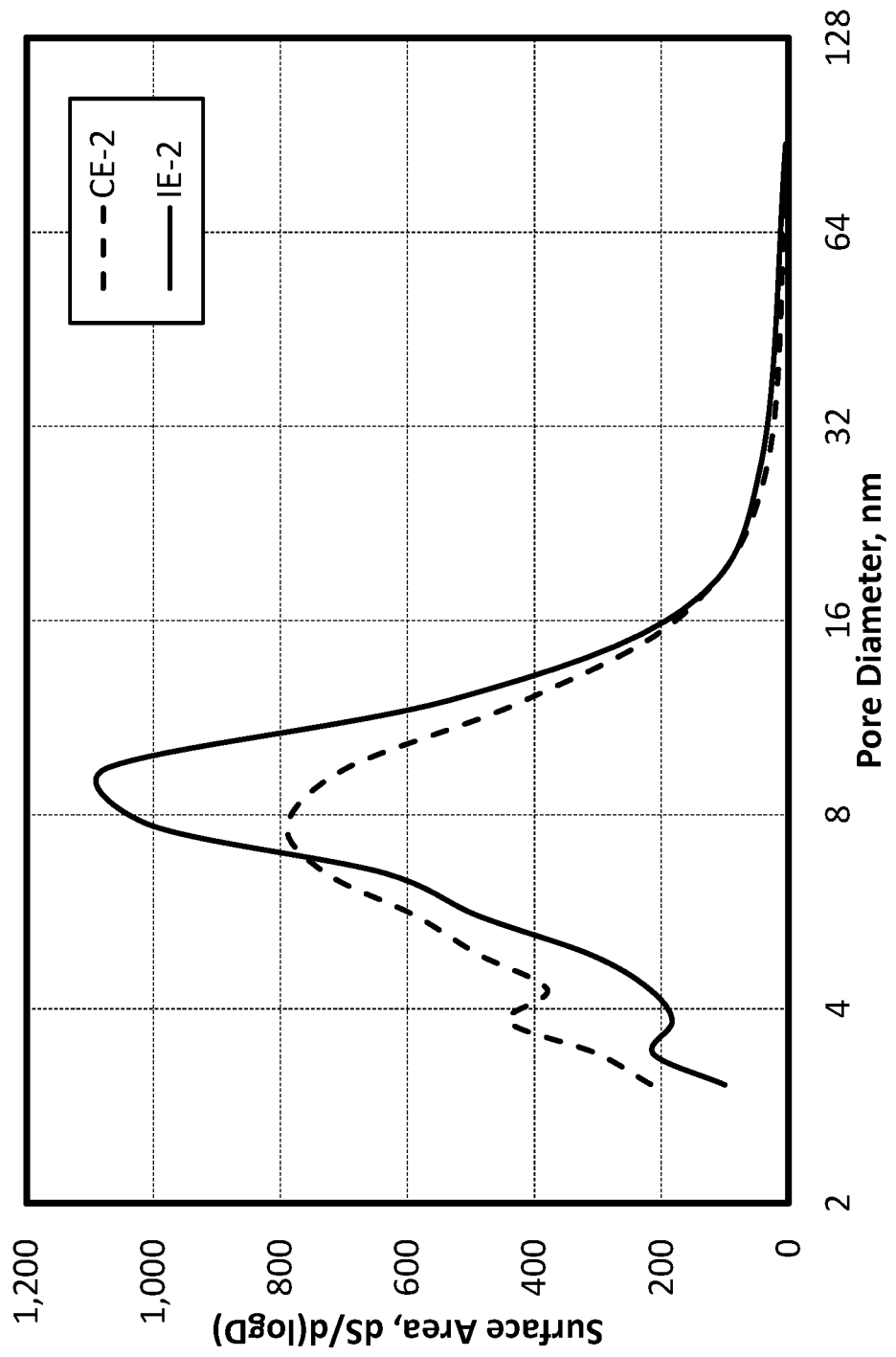
FIG. 4 presents plots of the surface area distributions as a function of pore diameter (nm) for the fluorided silica-coated aluminas of CE-2 and IE-2.

FIGS. 1-2 illustrate the pore volume distributions and surface area distributions, respectively, as a function of pore diameter (nm) for the silica-coated aluminas of CE-1 and IE-1, while FIGS. 3-4 illustrate the pore volume distributions and surface area distributions as a function of pore diameter (nm) for the fluorided silica-coated aluminas of CE-2 and IE-2. Some of the data expressed graphically in FIGS. 1-4 is tabulated in Table I. Table I shows the result of summing up the pore volume and the surface area into several pore size categories, using the raw data obtained from nitrogen desorption curves. Data is expressed in percentages as well as in absolute terms: mL/g for pore volume and $m^2/g$ for surface area. Particle size testing of the fluorided silica-coated aluminas of CE-2 and IE-2, presented in FIGS. 3-4 and Table I, was performed after drying and calcining of the respective fluorided silica-coated aluminas.

Referring first to the CE-1 and IE-1 silica-coated aluminas in the figures and data table, the total pore volume of IE-1 was significantly increased over CE-1, but in addition, there were also large increases in the average pore diameter, the peak pore diameter, and the respective amounts of pore volume and surface area present in larger pores.

After fluoriding, drying, and calcining, the figures and data table also demonstrate the same beneficial improvements for the fluorided silica-coated alumina of IE-2 as compared to CE-2. Although the overall pore volume was not increased as dramatically as for the silica-coated alumina base material, there were large increases in the average pore diameter and the peak pore diameter (over 20%), and significant increases in the respective amounts of pore volume and surface area present in larger pores for IE-2 as compared to CE-2. Advantageously, the IE-2 fluorided silica-coated alumina, as compared to CE-2, had a much larger amount of meso-pores (generally, pores with a pore diameter greater than or equal to 10 nm), with a significant reduction in the amount of small pores (e.g., less than 6 nm in diameter).

Figure 5:
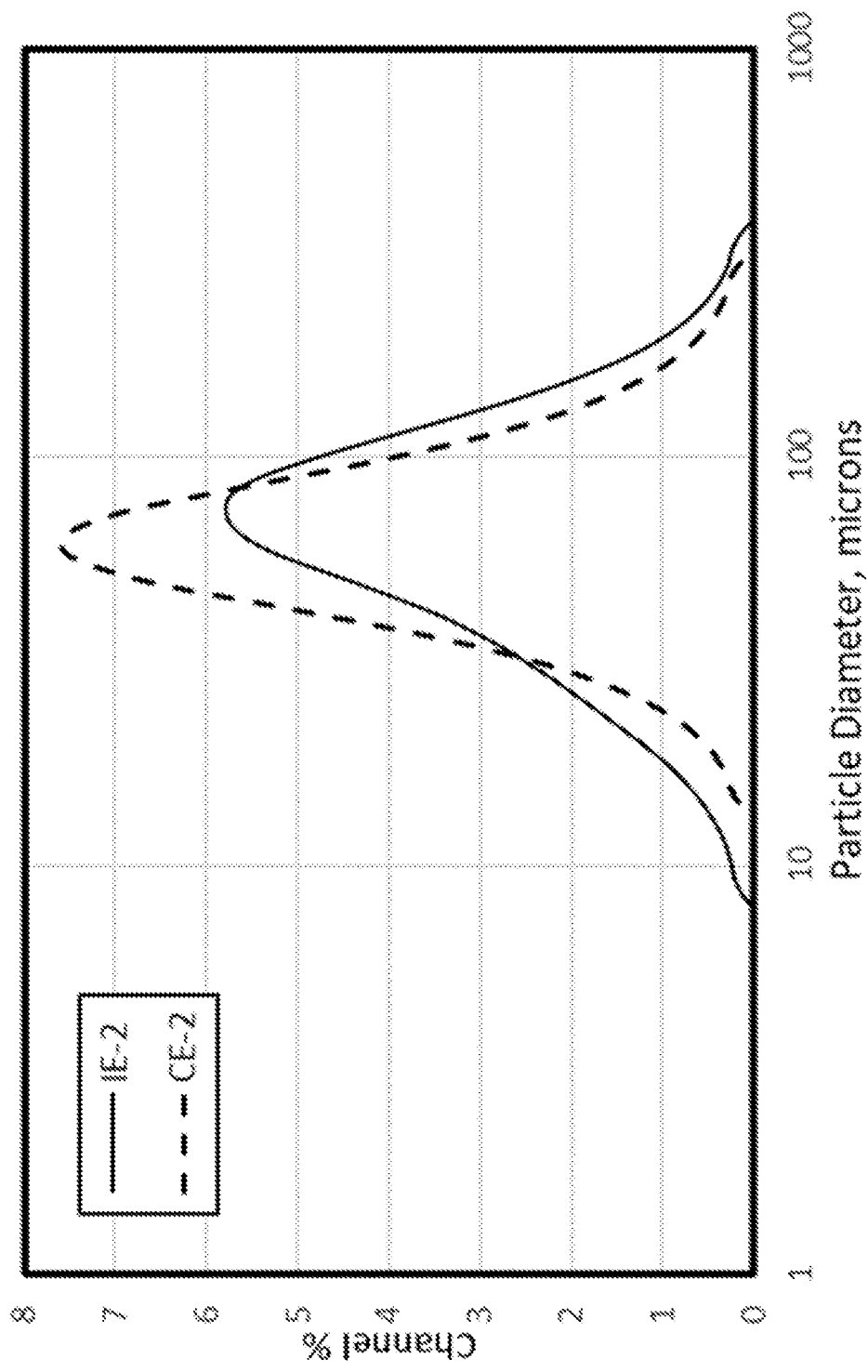
FIG. 5 presents a plot of the particle size distributions of the fluorided silica-coated aluminas of CE-2 and IE-2.

FIG. 5 illustrates the particle size distributions of IE-2 and CE-2, and key particle size distribution metrics for IE-2 are summarized in Table II. Very small particles, often referred to as fines, can be problematic in polymerization reactor systems. Beneficially, although the particle size distribution of IE-2 was slightly broader than CE-2, only a very small fraction of IE-2 had a particle size of less than 10 μm (the d10 particle size was 24.6 μm). The fluorided silica-coated alumina of IE-2 had a d50 average particle size of 63 μm, a ratio of d90/d10 of 5.4, a ratio of d90/d50 of 2.1, and a span of 1.7.

The ability of the fluorided silica-coated alumina (FSCA) of IE-2 to adsorb a metallocene compound also was compared to CE-2. The metallocene compound (MET) was 1-(methyl)-1-(3-butenyl)-1-(cyclopentadienyl)-1-(2,7-di-tert-butylfluorenyl) methane zirconium dichloride (a bridged cyclopentadienyl-fluorenyl metallocene compound with a carbon bridge substituted with a methyl and a terminal butenyl). First, a stock solution of the metallocene compound (MET) was prepared by dissolving 80 mg of MET in a solvent mixture containing 8 mL of toluene and 80 mL of heptane. The concentration of MET in the stock solution was 0.91 mg/mL or 1.56 μmol/mL.

The adsorption experiments were performed by mixing 8 mL of the MET stock solution with IE-2 and CE-2, respectively, at room temperature, then shaking the mixture for 1 min, then allowing the mixture to settle for 15 min. The supernatant liquid from the mixture was measured by UV-Vis at 582 nm wavelength to determine the amount of MET in the supernatant liquid. The amount of MET adsorbed on IE-2 or CE-2 was calculated by subtracting the amount of MET left in the supernatant liquid from the amount of MET in the stock solution used in the experiment.

Table III summarizes the adsorption experiments with IE-2 and CE-2. CE-2 only adsorbed 51 micromoles of the MET metallocene compound per gram of CE-2, whereas IE-2 unexpectedly adsorbed 98 micromoles of MET per gram of IE-2 (an increase of 92%). Stated another way, CE-2 only adsorbed 0.087 molecules of the MET metallocene compound per $nm^2$ of surface area of CE-2, whereas IE-2 unexpectedly adsorbed 0.178 molecules of MET per $nm^2$ of surface area of IE-2 (an increase of 104%). The molecules of MET adsorbed per $nm^2$ of the surface area of the respective FSCA were determined using the BET surface area from Table I, the adsorption in μmol/g from Table III, and Avogadro's number.

While not wishing to be bound by the following theory, it is believed that IE-2 has better contact (or dispersion) between silica and alumina, which generates more acid sites, which increases the absorptivity (and the catalytic activity, discussed below). Thus, IE-2 effectively has a greater number of acid sites or a greater number of "ionizing" sites than does CE-2, and each site can adsorb one base molecule (the MET metallocene compound is a weak base) and subsequently ionize the metallocene base.

Polymerization Examples 3-12

The general procedure for the polymerization experiments was as follows. The polymerization experiments are summarized in Table IV, and were conducted in a 1-gallon autoclave reactor, with isobutane diluent (~2 L) used in all experiments. The fluorided silica-coated alumina (~50 mg), 1 mmol of TIBA (1 M solution in hexanes), and 0.5-1.0 mg of a metallocene compound (which was 1-(methyl)-1-(3-butenyl)-1-(cyclopentadienyl)-1-(2,7-di-tert-butylfluorenyl) methane zirconium dichloride; 1 mg/mL toluene solution) were charged to the reactor, followed by isobutane addition. Excess metallocene was utilized, so that the activity of the fluorided silica-coated alumina could be evaluated. The contents of the reactor were stirred and heated to the desired polymerization temperature of 90° C. Ethylene was then introduced into the reactor (no hydrogen or comonomer was added), and ethylene was fed on demand to maintain the target pressure of 390 psig (2.69 MPa) for the desired reaction time of 30 min. The reactor was maintained at 90° C. throughout the run by an automated heating-cooling system. After venting of the reactor, purging, and cooling, the resulting polymer product was dried under reduced pressure.

Table IV summarizes the results of the polymerization experiments, where Examples 3-8 used the CE-2 fluorided silica-coated alumina, Examples 9-12 used the IE-2 fluorided silica-coated alumina, the catalyst activity is in units of grams of polymer per gram of fluorided silica-coated alumina per hour (g/g/hr), and the CY-a parameter of the resultant polymer was measured. Unexpectedly, the catalytic activity using the fluorided silica-coated alumina of IE-2 was improved, on average, over 100% versus CE-2.

The Carreau-Yasuda "a" parameter (CY-a parameter) is particularly sensitive to small changes in the polymer, such as long chain branch (LCB) content. Surprisingly, given the significant differences in catalytic activity between Examples 3-8 and Examples 9-12, there was no difference in the CY-a parameter, thus indicating that the basic polymer properties were not appreciably changed.

Inventive Examples 13-16

Inventive Examples 14A-15A, similar to IE-1, each contained 40 wt. % silica and 60 wt. % alumina, while Inventive Example 13A contained 28 wt. % silica and 72 wt. % alumina. Using the same fluoriding and calcining procedures described above, IE-13A was treated with an aqueous solution of $HBF_4$ to yield 12.5 wt. % F (IE-13B), and IE-14A was treated with an aqueous solution of $HBF_4$ to yield 5 wt. % F (IE-14B). IE-15A was first calcined at 600° C. for three hr, and then treated with an aqueous solution of $HBF_4$ to yield 7 wt. % F (IE-15B). The bulk densities for these examples were in the 0.18 to 0.32 g/mL range.

Like Table I, Table V shows the result of summing up the pore volume and the surface area into several pore size categories, using the raw data obtained from nitrogen desorption curves. Data is expressed in percentages as well as in absolute terms: mL/g for pore volume and $m^2/g$ for surface area. After fluoriding, drying, and calcining, Table V demonstrates the same beneficial improvements as for the fluorided silica-coated alumina of IE-2 as compared to CE-2 in Table I. As compared to CE-2, the fluorided silica-coated alumina materials of IE-13B, IE-14B, and IE-15B had higher pore volumes and much larger average pore diameters. Beneficially, the IE-13B, IE-14B, and IE-15B fluorided silica-coated aluminas, as compared to CE-2, had a much larger amount of meso-pores (generally, pores with a pore diameter greater than or equal to 10 nm), with a significant reduction in the amount of small pores (e.g., less than 6 nm in diameter).

Like Table III, Table VI summarizes the adsorption experiments with IE-13B, IE-14B, IE-15B, and IE-16B (IE-16B was prepared similarly to IE-15B, except with 14 wt. % F). Unexpectedly, these inventive fluorided silica-coated alumina support materials adsorbed from 60 to over 120 micromoles of MET per gram of the respective support. While CE-2 only adsorbed 0.087 molecules of the MET metallocene compound per $nm^2$ of surface area of CE-2, the inventive fluorided silica-coated alumina support materials in Table VI unexpectedly adsorbed from 0.13 to 0.21 molecules of MET per $nm^2$ of surface area of the respective support.

TABLE I

| Example | Fluorided Silica-Coated Alumina | | Silica-Coated Alumina | | Increase (IE versus CE) | |
|---|---|---|---|---|---|---|
| | CE-2 | IE-2 | CE-1 | IE-1 | After F | Before F |
| BET surface area, $m^2/g$ | 352 | 331 | 464 | 407 | −6% | −12% |
| Total PV, mL/g | 0.840 | 0.963 | 0.961 | 1.643 | 15% | 71% |
| Avg Pore diam, nm | 9.54 | 11.65 | 8.28 | 16.15 | 22% | 95% |
| Peak Pore diam, nm | 7.73 | 9.45 | 6.51 | 7.71 | 22% | 18% |
| Bulk density, g/mL | 0.32 | 0.21 | — | — | −34% | — |
| PV > diam 6 nm, mL/g | 0.664 | 0.863 | 0.702 | 1.611 | 30% | 129% |
| PV > diam 10 nm mL/g | 0.313 | 0.390 | 0.471 | 1.000 | 24% | 112% |
| PV > diam 16 nm, mL/g | 0.110 | 0.153 | 0.124 | 0.521 | 39% | 319% |
| PV > diam 20 nm, mL/g | 0.078 | 0.112 | 0.089 | 0.234 | 43% | 162% |
| PV > diam 40 nm, mL/g | 0.027 | 0.045 | 0.034 | 0.164 | 65% | 378% |
| BJH desorption PV, mL/g | 0.848 | 0.993 | 0.924 | 1.703 | — | — |
| PV > diam 6 nm, % | 78.3% | 86.9% | 76.0% | 94.6% | 11% | 25% |
| PV > diam 10 nm, % | 36.9% | 39.3% | 51.0% | 58.7% | 6% | 15% |
| PV > diam 16 nm, % | 13.0% | 15.4% | 13.4% | 30.6% | 19% | 127% |
| PV > diam 20 nm, % | 9.2% | 11.3% | 9.7% | 13.7% | 22% | 42% |
| PV > diam 40 nm % | 3.2% | 4.5% | 3.7% | 9.6% | 41% | 159% |
| SA > diam 6 nm, $m^2/g$ | 239 | 307 | 251 | 479 | 28% | 91% |
| SA > diam 10 nm, $m^2/g$ | 72 | 88 | 75.4 | 198 | 21% | 162% |
| SA > diam 16 nm, $m^2/g$ | 13 | 18 | 11.8 | 59 | 32% | 397% |
| SA > diam 20 nm, $m^2/g$ | 7.4 | 11 | 8.6 | 11 | 44% | 22% |
| SA > diam 40 nm, $m^2/g$ | 1.3 | 2.1 | 1.6 | 7.6 | 57% | 382% |
| BJH desorption SA, $m^2/g$ | 392 | 411 | 435 | 545 | — | — |
| SA > diam 6 nm, % | 60.9% | 74.6% | 57.8% | 88.0% | 23% | 52% |
| SA > diam 10 nm, % | 18.5% | 21.4% | 17.3% | 36.3% | 16% | 109% |
| SA > diam 16 nm, % | 3.4% | 4.3% | 2.7% | 10.7% | 26% | 297% |
| SA > diam 20 nm, % | 1.90% | 2.61% | 1.98% | 1.93% | 38% | −2% |
| SA > diam 40 nm % | 0.33% | 0.50% | 0.36% | 1.39% | 50% | 285% |

TABLE II

| Example | IE-2 |
|---|---|
| Mv, mean, μm | 73.3 |
| Mn, number avg, μm | 19.3 |
| MA, area mean, μm | 48.0 |
| CS, surface area | 0.125 |
| Std Dev, μm | 40.5 |
| Mz, graphic mean | 68.9 |
| σ1, graphic std. dev. | 42.3 |
| Ski, skewness | 0.29 |
| Kg, peakedness | 1.12 |
| D10, μm | 24.66 |
| D20, μm | 35.15 |
| D30, μm | 44.89 |
| D40, μm | 54.12 |
| D50, μm | 63.44 |
| D60, μm | 73.71 |
| D70, μm | 85.97 |
| D80, μm | 102.8 |
| D90, μm | 132.2 |
| D95, μm | 164.1 |
| D90/D10 | 5.36 |
| D90/D50 | 2.08 |
| Span | 1.69 |

TABLE III

| Fluorided Silica-Coated Alumina | | FSCA | CE-2 | IE-2 |
|---|---|---|---|---|
| Weight FSCA | mg | | 105 | 103 |
| MET stock solution | mL | | 8 | 8 |
| MET in stock solution | mg/mL | | 0.91 | 0.91 |
| | µmol/mL | | 1.56 | 1.56 |
| | mg | | 7.27 | 7.27 |
| | µmol | | 12.45 | 12.45 |
| MET in the supernatant after adsorption | mg/mL | | 0.52 | 0.18 |
| | µmol/mL | | 0.89 | 0.30 |
| | mg | | 4.16 | 1.40 |
| | µmol | | 7.13 | 2.40 |
| MET adsorbed by FSCA | mg | | 3.11 | 5.87 |
| | µmol | | 5.32 | 10.05 |
| | mg/g | | 29.6 | 57.0 |
| | µmol/g | | 50.7 | 97.6 |
| | molecules/nm$^2$ | | 0.087 | 0.178 |

TABLE IV

| Example | Fluorided Silica-Coated Alumina | Support Activity (g/g/hr) | CY-a parameter |
|---|---|---|---|
| 3 | CE-2 | 3,042 | — |
| 4 | CE-2 | 3,524 | — |
| 5 | CE-2 | 3,532 | 0.4698 |
| 6 | CE-2 | 3,340 | 0.4150 |
| 7 | CE-2 | 3,246 | 0.4570 |
| 8 | CE-2 | 3,324 | 0.4676 |
| 9 | IE-2 | 7,244 | 0.4352 |
| 10 | IE-2 | 7,192 | 0.4037 |
| 11 | IE-2 | 7,376 | 0.4554 |
| 12 | IE-2 | 7,728 | 0.4714 |

TABLE V

| | Fluorided Silica-Coated Alumina | | | Silica-Coated Alumina | | |
|---|---|---|---|---|---|---|
| Example | IE-13B | IE-14B | IE-15B | IE-13A | IE-14A | IE-15A |
| BET surface area, m$^2$/g | 270 | 424 | 381 | 326 | 440 | 468 |
| Total PV, mL/g | 1.219 | 1.388 | 1.458 | 1.396 | 1.618 | 1.352 |
| Avg Pore diam, nm | 18.07 | 13.11 | 15.30 | 17.15 | 14.69 | 11.55 |
| PV > diam 6 nm, mL/g | 1.214 | 1.287 | 1.396 | 1.374 | 1.508 | 1.172 |
| PV > diam 10 nm mL/g | 0.874 | 0.746 | 0.830 | 1.062 | 0.844 | 0.563 |
| PV > diam 16 nm, mL/g | 0.420 | 0.322 | 0.409 | 0.468 | 0.463 | 0.281 |
| PV > diam 20 nm, mL/g | 0.324 | 0.242 | 0.312 | 0.336 | 0.368 | 0.216 |
| PV > diam 40 nm, mL/g | 0.158 | 0.101 | 0.123 | 0.139 | 0.167 | 0.087 |
| BJH desorption PV, mL/g | 1.256 | 1.426 | 1.519 | 1.420 | 1.673 | 1.376 |
| PV > diam 6 nm, % | 96.7% | 90.3% | 91.9% | 96.8% | 90.1% | 85.2% |
| PV > diam 10 nm, % | 69.6% | 52.3% | 54.7% | 74.8% | 50.5% | 40.9% |
| PV > diam 16 nm, % | 33.4% | 22.6% | 26.9% | 33.0% | 27.7% | 20.4% |
| PV > diam 20 nm, % | 25.8% | 17.0% | 20.6% | 23.7% | 22.0% | 15.7% |
| PV > diam 40 nm % | 12.6% | 7.1% | 8.1% | 9.8% | 10.0% | 6.3% |
| SA > diam 6 nm, m$^2$/g | 324 | 407 | 427 | 358 | 471 | 401 |
| SA > diam 10 nm, m$^2$/g | 174 | 161 | 169 | 222 | 159 | 114 |
| SA > diam 16 nm, m$^2$/g | 45 | 37 | 47 | 57 | 49 | 32 |
| SA > diam 20 nm, m$^2$/g | 27 | 22 | 29 | 31 | 32 | 20 |
| SA > diam 40 nm, m$^2$/g | 7 | 5 | 6 | 7 | 8 | 4 |
| BJH desorption SA, m$^2$/g | 356 | 519 | 519 | 391 | 596 | 562 |
| SA > diam 6 nm, % | 91.0% | 78.4% | 82.3% | 91.6% | 79.1% | 71.2% |
| SA > diam 10 nm, % | 49.0% | 31.1% | 32.5% | 56.9% | 26.7% | 20.2% |
| SA > diam 16 nm, % | 12.6% | 7.1% | 9.0% | 14.5% | 8.2% | 5.6% |
| SA > diam 20 nm, % | 7.6% | 4.2% | 5.7% | 7.9% | 5.4% | 3.6% |
| SA > diam 40 nm % | 2.0% | 0.9% | 1.1% | 1.7% | 1.3% | 0.7% |

TABLE VI

| Example | IE-13B | IE-14B | IE-15B | IE-16B |
|---|---|---|---|---|
| Silica, wt. % | 28 | 40 | 40 | 40 |
| Total PV, mL/g | 1.22 | 1.39 | 1.46 | 1.40 |

TABLE VI-continued

| Example | IE-13B | IE-14B | IE-15B | IE-16B |
|---|---|---|---|---|
| Pre-calcined | No | No | Yes | Yes |
| Fluorine, wt. % | 12.5 | 5 | 7 | 14 |
| MET adsorbed, µmol/g | 59.6 | 122.1 | 117.7 | 107.3 |
| BET surface area, m$^2$/g | 270 | 424 | 381 | 310 |
| MET adsorbed, molecules/nm$^2$ | 0.133 | 0.173 | 0.186 | 0.208 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A fluorided silica-coated alumina having (or characterized by) a bulk density from 0.15 to 0.37 g/mL, a total pore volume from 0.85 to 2 mL/g, a BET surface area from 200 to 500 m$^2$/g, and an average pore diameter from 10 to 25 nm.

Aspect 2. A fluorided silica-coated alumina having (or characterized by) a bulk density from 0.15 to 0.37 g/mL, a total pore volume from 0.85 to 2 mL/g, a BET surface area from 200 to 500 m$^2$/g, and from 80 to 99% of pore volume in pores with diameters of greater than 6 nm.

Aspect 3. The fluorided silica-coated alumina defined aspect 1 or 2, wherein the fluorided silica-coated alumina contains any suitable amount of silica or an amount of silica in any range disclosed herein, e.g., from 10 to 80 wt. % silica, from 20 to 60 wt. % silica, from 25 to 55 wt. % silica, or from 35 to 45 wt. % silica, based on the weight of silica-coated alumina.

Aspect 4. The fluorided silica-coated alumina defined in any one of the preceding aspects, wherein the fluorided silica-coated alumina contains any suitable amount of fluorine or an amount of fluorine in any range disclosed herein, e.g., from 0.5 to 18 wt. % F, from 1 to 13 wt. % F, from 2 to 9 wt. % F, from 3 to 16 wt. % F, or from 3 to 10 wt. % F, based on the weight of the fluorided silica-coated alumina.

Aspect 5. The fluorided silica-coated alumina defined in any one of the preceding aspects, wherein the fluorided silica-coated alumina has any suitable average (d50) particle size or an average particle size in any range disclosed herein, e.g., from 30 to 150 microns, from 40 to 100 microns, or from 45 to 85 microns.

Aspect 6. The fluorided silica-coated alumina defined in any one of the preceding aspects, wherein the bulk density is in any suitable range or any range disclosed herein, e.g., from 0.15 to 0.32 g/mL, from 0.17 to 0.3 g/mL, from 0.18 to 0.28 g/mL, or from 0.18 to 0.25 g/mL.

Aspect 7. The fluorided silica-coated alumina defined in any one of the preceding aspects, wherein the total pore volume is in any suitable range or any range disclosed herein, e.g., from 0.85 to 1.6 mL/g, from 0.9 to 1.8 mL/g, from 0.9 to 1.5 mL/g, or from 1 to 1.7 mL/g.

Aspect 8. The fluorided silica-coated alumina defined in any one of the preceding aspects, wherein the BET surface area is in any suitable range or any range disclosed herein, e.g., from 250 to 450 m$^2$/g, from 200 to 425 m$^2$/g, or from 270 to 425 m$^2$/g.

Aspect 9. The fluorided silica-coated alumina defined in any one of the preceding aspects, wherein the fluorided silica-coated alumina has an average pore diameter in any suitable range or any range disclosed herein, e.g., from 10 to 20 nm, from 10.5 to 22 nm, from 11 to 22 nm, or from 11 to 19 nm.

Aspect 10. The fluorided silica-coated alumina defined in any one of the preceding aspects, wherein the fluorided silica-coated alumina has any suitable percentage of the pore volume in pores with diameters of greater than 6 nm or an amount in any range disclosed herein, e.g., from 80 to 97%, from 82 to 99%, from 82 to 97%, from 83 to 98%, or from 84 to 99%.

Aspect 11. The fluorided silica-coated alumina defined in any one of the preceding aspects, wherein the fluorided silica-coated alumina has any suitable percentage of the pore volume in pores with diameters of greater than 20 nm or an amount in any range disclosed herein, e.g., from 9.5 to 30%, from 10 to 30%, from 10 to 27%, from 10.5 to 28%, or from 11 to 26%.

Aspect 12. The fluorided silica-coated alumina defined in any one of the preceding aspects, wherein the fluorided silica-coated alumina has any suitable percentage of the pore volume in pores with diameters of greater than 40 nm or an amount in any range disclosed herein, e.g., from 3.5 to 15%, from 3.5 to 13%, from 4 to 15%, from 4 to 13%, or from 5 to 15%.

Aspect 13. The fluorided silica-coated alumina defined in any one of the preceding aspects, wherein the fluorided silica-coated alumina has any suitable pore volume of pores with diameters of greater than 6 nm or an amount in any range disclosed herein, e.g., at least mL/g, at least 0.8 mL/g, at least 0.85 mL/g, from 0.7 to 1.6 mL/g, from 0.7 to 1.4 mL/g, from 0.75 to 1.5 mL/g, from 0.8 to 1.6 mL/g, or from 0.8 to 1.4 mL/g.

Aspect 14. The fluorided silica-coated alumina defined in any one of the preceding aspects, wherein the fluorided silica-coated alumina has any suitable pore volume of pores with diameters of greater than 20 nm or an amount in any range disclosed herein, e.g., at least 0.09 mL/g, at least 0.1 mL/g, from 0.09 to 0.4 mL/g, from 0.09 to 0.34 mL/g, from 0.1 to 0.4 mL/g, from 0.1 to 0.36 mL/g, or from 0.11 to 0.34 mL/g.

Aspect 15. The fluorided silica-coated alumina defined in any one of the preceding aspects, wherein the fluorided silica-coated alumina has any suitable percentage of surface area in pores with diameters of greater than 6 nm or an amount in any range disclosed herein, e.g., from 65 to 98%, from 65 to 94%, from 65 to 91%, from 68 to 94%, from 70 to 98%, or from 70 to 91%.

Aspect 16. The fluorided silica-coated alumina defined in any one of the preceding aspects, wherein the fluorided silica-coated alumina has any suitable percentage of surface area in pores with diameters of greater than 10 nm or an amount in any range disclosed herein, e.g., from 19.5 to 55%, from 20 to 55%, from 20 to 50%, from 21 to 55%, or from 21 to 50%.

Aspect 17. The fluorided silica-coated alumina defined in any one of the preceding aspects, wherein the fluorided silica-coated alumina has any suitable surface area of pores with diameters of greater than 6 nm or an amount in any range disclosed herein, e.g., at least 250 m$^2$/g, at least 275 m$^2$/g, from 250 to 475 m$^2$/g, or from 275 to 450 m$^2$/g.

Aspect 18. The fluorided silica-coated alumina defined in any one of the preceding aspects, wherein the fluorided silica-coated alumina has any suitable surface area of pores with diameters of greater than 10 nm or an amount in any range disclosed herein, e.g., at least 78 m$^2$/g, at least 85 m$^2$/g, from 78 to 200 m$^2$/g, or from 85 to 180 m$^2$/g.

Aspect 19. A catalyst composition comprising a metallocene compound, the fluorided silica-coated alumina defined in any one of the preceding aspects, and an optional co-catalyst.

Aspect 20. The composition defined in aspect 19, wherein the metallocene compound comprises any suitable metallocene compound or any metallocene compound disclosed herein.

Aspect 21. The composition defined in aspect 19 or 20, wherein the metallocene compound comprises an unbridged zirconium or hafnium based metallocene compound containing two cyclopentadienyl groups, two indenyl groups, or a cyclopentadienyl and an indenyl group.

Aspect 22. The composition defined in any one of aspects 19-21, wherein the metallocene compound comprises a bridged zirconium or hafnium based metallocene compound with a fluorenyl group.

Aspect 23. The composition defined in any one of aspects 19-21, wherein the metallocene compound comprises a bridged zirconium or hafnium based metallocene compound with a cyclopentadienyl group and a fluorenyl group.

Aspect 24. The composition defined in any one of aspects 19-23, wherein the catalyst composition comprises only one metallocene compound.

Aspect 25. The composition defined in any one of aspects 19-23, wherein the catalyst composition comprises two or more metallocene compounds.

Aspect 26. The composition defined in any one of aspects 19-25, wherein the catalyst composition comprises the co-catalyst, e.g., any co-catalyst disclosed herein.

Aspect 27. The composition defined in aspect 26, wherein the co-catalyst comprises an aluminoxane compound, an organoboron or organoborate compound, an ionizing ionic compound, an organoaluminum compound, an organozinc compound, an organomagnesium compound, an organolithium compound, or any combination thereof.

Aspect 28. The composition defined in aspect 26, wherein the co-catalyst comprises any suitable organoaluminum compound or any organoaluminum compound disclosed herein.

Aspect 29. The composition defined in any one of aspects 19-26, wherein the catalyst composition is substantially free of aluminoxane compounds, organoboron or organoborate compounds, ionizing ionic compounds, or combinations thereof.

Aspect 30. The composition defined in any one of aspects 19-29, wherein a catalyst activity of the catalyst composition is in any range disclosed herein, e.g., from 3,000 to 20,000, from 4,000 to 15,000, or from 4,000 to 9,000 grams of ethylene polymer per gram of the fluorided silica-coated alumina per hr (additionally or alternatively, from 100,000 to 1,000,000, from 150,000 to 600,000, or from 200,000 to 500,000 grams of ethylene polymer per gram of the metallocene compound per hour), under slurry polymerization conditions, with a triisobutylaluminum co-catalyst, using isobutane as the diluent, at a polymerization temperature of 75 to 100° C. (e.g., 95° C.) and a reactor pressure of 300 (2.07 MPa) to 500 psig (3.45 MPa) (e.g., 400 psig (2.76 MPa)).

Aspect 31. An olefin polymerization process, the process comprising contacting the catalyst composition defined in any one of aspects 19-30 with an olefin monomer and an optional olefin comonomer in a polymerization reactor system under polymerization conditions to produce an olefin polymer.

Aspect 32. The olefin polymerization process defined in aspect 31, wherein the olefin monomer comprises any olefin monomer disclosed herein, e.g., any $C_2$-$C_{20}$ olefin.

Aspect 33. The olefin polymerization process defined in aspect 31, wherein the olefin monomer and the optional olefin comonomer independently comprise a $C_2$-$C_{20}$ alpha-olefin.

Aspect 34. The olefin polymerization process defined in any one of aspects 31-33, wherein the olefin monomer comprises ethylene.

Aspect 35. The olefin polymerization process defined in any one of aspects 31-34, wherein the catalyst composition is contacted with ethylene and an olefin comonomer comprising a $C_3$-$C_{10}$ alpha-olefin.

Aspect 36. The olefin polymerization process defined in any one of aspects 31-35, wherein the catalyst composition is contacted with ethylene and an olefin comonomer comprising 1-butene, 1-hexene, 1-octene, or a mixture thereof.

Aspect 37. The olefin polymerization process defined in any one of aspects 31-36, wherein the polymerization reactor system comprises a batch reactor, a slurry reactor, a gas-phase reactor, a solution reactor, a high pressure reactor, a tubular reactor, an autoclave reactor, or a combination thereof.

Aspect 38. The olefin polymerization process defined in any one of aspects 31-37, wherein the polymerization reactor system comprises a slurry reactor, a gas-phase reactor, a solution reactor, or a combination thereof.

Aspect 39. The olefin polymerization process defined in any one of aspects 31-38, wherein the polymerization reactor system comprises a loop slurry reactor.

Aspect 40. The olefin polymerization process defined in any one of aspects 31-39, wherein the polymerization reactor system comprises a single reactor.

Aspect 41. The olefin polymerization process defined in any one of aspects 31-39, wherein the polymerization reactor system comprises 2 reactors.

Aspect 42. The olefin polymerization process defined in any one of aspects 31-39, wherein the polymerization reactor system comprises more than 2 reactors.

Aspect 43. The olefin polymerization process defined in any one of aspects 31-42, wherein the olefin polymer comprises any olefin polymer disclosed herein.

Aspect 44. The olefin polymerization process defined in any one of aspects 31-43, wherein the olefin polymer comprises an ethylene homopolymer, an ethylene/1-butene copolymer, an ethylene/1-hexene copolymer, and/or an ethylene/1-octene copolymer.

Aspect 45. The olefin polymerization process defined in any one of aspects 31-44, wherein the polymerization conditions comprise a polymerization reaction temperature in a range from 60° C. to 120° C. and a reaction pressure in a range from 200 to 1000 psig (from 1.4 to 6.9 MPa).

Aspect 46. The olefin polymerization process defined in any one of aspects 31-45, wherein the polymerization conditions are substantially constant, e.g., for a particular polymer grade, such as within +/−20%, +/−10%, or +/−5%.

Aspect 47. The olefin polymerization process defined in any one of aspects 31-46, wherein no hydrogen is added to the polymerization reactor system.

Aspect 48. The olefin polymerization process defined in any one of aspects 31-46, wherein hydrogen is added to the polymerization reactor system.

Aspect 49. An olefin polymer produced by the olefin polymerization process defined in any one of aspects 31-48.

Aspect 50. A process to produce a fluorided silica-coated alumina, the process comprising contacting a fluoriding agent with a silica-coated alumina to produce the fluorided silica-coated alumina, wherein the silica-coated alumina has (or is characterized by) a bulk density from 0.15 to 0.37 g/mL, a total pore volume from 1.1 to 2.5 mL/g, a BET surface area from 250 to 600 m$^2$/g, and an average pore diameter from 10 to 25 nm.

Aspect 51. The process defined in aspect 50, wherein the fluoriding agent and the silica-coated alumina are contacted in water to form an aqueous mixture of the fluorided silica-coated alumina.

Aspect 52. The process defined in aspect 50 or 51, further comprising a step of drying the fluorided silica-coated alumina, a step of calcining the fluorided silica-coated alumina, or both.

Aspect 53. The process defined in any one of aspects 50-52, wherein the fluoriding agent comprise hydrogen fluoride (HF), ammonium bifluoride (NH$_4$HF$_2$), triflic acid (CF$_3$SO$_3$H), tetrafluoroboric acid (HBF$_4$), hexafluorosilicic acid (H$_2$SiF$_6$), hexafluorophosphoric acid (HPF$_6$), zinc tetrafluoroborate (Zn(BF$_4$)$_2$), or any combination thereof.

Aspect 54. The process defined in any one of aspects 50-52, wherein the fluoriding agent comprise hydrogen fluoride (HF).

Aspect 55. The process defined in any one of aspects 50-54, wherein the fluorided silica-coated alumina is defined by any one of aspects 1-18.

Aspect 56. A supported metallocene catalyst comprising a metallocene compound and a fluorided silica-coated alumina, wherein an amount of the metallocene compound adsorbed per gram of the fluorided silica-coated alumina is in any suitable range or in any range disclosed herein, e.g., at least 55 μmol/g, at least 60 μmol/g, from 55 to 155 μmol/g, or from 60 to at least 130 μmol/g.

Aspect 57. A supported metallocene catalyst comprising a metallocene compound and a fluorided silica-coated alumina, wherein a number of molecules of the metallocene compound adsorbed per nm$^2$ of surface area of the fluorided silica-coated alumina is in any suitable range or in any range disclosed herein, e.g., at least 0.1 molecules per nm$^2$, at least molecules per nm$^2$, from 0.1 to 0.3 molecules per nm$^2$, from 0.1 to 0.24 molecules per nm$^2$, or from 0.12 to 0.22 molecules per nm 2.

Aspect 58. The catalyst defined in aspect 56 or 57, wherein the supported metallocene catalyst (or the fluorided silica-coated alumina) is defined by any one of aspects 1-18.

Aspect 59. An ethylene polymer having (or characterized by) a melt index (MI) in a range from 0.1 to 10 g/10 min and a density in a range from 0.91 to 0.96 g/cm$^3$, wherein the ethylene polymer contains from 70 to 270 ppm solid oxide and from 2 to 18 ppm fluorine.

Aspect 60. The polymer defined in aspect 59, wherein the MI is in any range disclosed herein, e.g., from 0.3 to 8, from 0.5 to 5, from 0.8 to 3, or from 0.5 to 2 g/10 min.

Aspect 61. The polymer defined in aspect 59 or 60, wherein the density is in any range disclosed herein, e.g., from 0.915 to 0.958, from 0.916 to 0.956, from 0.917 to 0.954, or from 0.915 to 0.952 g/cm$^3$.

Aspect 62. The polymer defined in any one of aspects 59-61, wherein the ethylene polymer contains from 70 to 250 ppm, from 100 to 250 ppm, from 100 to 200 ppm, from 100 to 150 ppm, from 120 to 250 ppm, from 120 to 200 ppm, or from 120 to 170 ppm of solid oxide.

Aspect 63. The polymer defined in any one of aspects 59-62, wherein the ethylene polymer contains from 2 to 16 ppm, from 2 to 14 ppm, from 2 to 12 ppm, from 2 to 10 ppm, from 3 to 16 ppm, from 3 to 12 ppm, from 4 to 12 ppm, or from 4 to 10 ppm of fluorine.

Aspect 64. The polymer defined any one of aspects 59-63, wherein the solid oxide contains silica and alumina in any suitable relative amount or a ratio of silica:alumina in any range disclosed herein, e.g., from 20:80 to 80:20, from 20:80 to 60:40, from 25:75 to 55:45, or from 35:65 to 45:55.

Aspect 65. The polymer defined in any one of aspects 59-64, wherein the ethylene polymer contains from 0.5 to 5 ppm, from 0.5 to 4 ppm, from 0.5 to 3 ppm, from 0.6 to 5 ppm, from 0.6 to 4 ppm, from 0.6 to 3 ppm, from 0.7 to 4 ppm, or from 0.7 to 2.5 ppm of zirconium (or hafnium, or titanium).

Aspect 66. The polymer defined in any one of aspects 59-65, wherein the ethylene polymer contains, independently, less than 0.1 ppm (by weight), less than 0.08 ppm, less than 0.05 ppm, or less than 0.03 ppm, of Mg, V, Ti, or Cr.

Aspect 67. The polymer defined in any one of aspects 59-66, wherein the ethylene polymer has a Mw in any range disclosed herein, e.g., from 25 to 400, from 40 to 300, from to 250, or from 80 to 200 kg/mol.

Aspect 68. The polymer defined in any one of aspects 59-67, wherein the ethylene polymer has a ratio of Mw/Mn in any range disclosed herein, e.g., from 2 to 25, from 2.1 to 20, from 2.3 to 20, from 2 to 5, or from 8 to 25.

Aspect 69. The polymer defined in any one of aspects 59-68, wherein the ethylene polymer has a unimodal molecular weight distribution.

Aspect 70. The polymer defined in any one of aspects 59-68, wherein the ethylene polymer has a bimodal molecular weight distribution.

Aspect 71. The polymer defined in any one of aspects 59-70, wherein the ethylene polymer comprises an ethylene homopolymer and/or an ethylene/α-olefin copolymer.

Aspect 72. The polymer defined in any one of aspects 59-71, wherein the ethylene polymer comprises an ethylene homopolymer, an ethylene/1-butene copolymer, an ethylene/1-hexene copolymer, and/or an ethylene/1-octene copolymer.

Aspect 73. The polymer defined in any one of aspects 59-72, wherein the ethylene polymer comprises an ethylene/1-hexene copolymer.

Aspect 74. The polymer defined in any one of aspects 59-73, wherein the polymer is produced by the olefin polymerization process defined in any one of aspects 31-48.

Aspect 75. An article (e.g., a film, pipe, or molded product) comprising the ethylene polymer defined in any one of aspects 59-74.

Aspect 76. An article comprising the ethylene polymer defined in any one of aspects 59-74, wherein the article is an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier.

We claim:

1. A fluorided silica-coated alumina having:
   a bulk density from 0.15 to 0.37 g/mL;
   a total pore volume from 0.85 to 2 mL/g;
   a BET surface area from 200 to 500 m$^2$/g; and
   an average pore diameter from 10 to 25 nm and/or from 80 to 99% of pore volume in pores with diameters of greater than 6 nm.

2. The fluorided silica-coated alumina of claim 1, wherein the fluorided silica-coated alumina contains:
   from 10 to 80 wt. % silica, based on a weight of silica-coated alumina; and
   from 0.5 to 18 wt. % F, based on a weight of the fluorided silica-coated alumina.

3. The fluorided silica-coated alumina of claim 1, wherein the fluorided silica-coated alumina has an average (d50) particle size from 30 to 150 microns.

4. The fluorided silica-coated alumina of claim 1, wherein:
   the bulk density is from 0.17 to 0.3 g/mL;
   the total pore volume is from 0.9 to 1.5 mL/g;
   the BET surface area is from 250 to 450 m$^2$/g;
   the average pore diameter is from 10 to 20 nm; and
   from 83 to 98% of the pore volume is in pores with diameters of greater than 6 nm.

5. The fluorided silica-coated alumina of claim 1, wherein:
   from 9.5 to 30% of the pore volume is in pores with diameters of greater than 20 nm;
   from 3.5 to 15% of the pore volume is in pores with diameters of greater than 40 nm;
   the fluorided silica-coated alumina has a pore volume of from 0.7 to 1.6 mL/g in pores with diameters of greater than 6 nm; and
   the fluorided silica-coated alumina has a pore volume of from 0.09 to 0.4 mL/g in pores with diameters of greater than 20 nm.

6. The fluorided silica-coated alumina of claim 1, wherein:
   from 65 to 98% of surface area is in pores with diameters of greater than 6 nm;
   from 19.5 to 55% of surface area is in pores with diameters of greater than 10 nm;
   the fluorided silica-coated alumina has a surface area of from 250 to 475 m$^2$/g in pores with diameters of greater than 6 nm; and the fluorided silica-coated alumina has a surface area of from 78 to 200 m²/g in pores with diameters of greater than 10 nm.

7. The fluorided silica-coated alumina of claim 1, wherein the average pore diameter of the fluorided silica-coated alumina is from 10 to 25 nm.

8. The fluorided silica-coated alumina of claim 7, wherein the fluorided silica-coated alumina contains:
   from 10 to 80 wt. % silica, based on a weight of silica-coated alumina; and
   from 0.5 to 18 wt. % F, based on a weight of the fluorided silica-coated alumina.

9. The fluorided silica-coated alumina of claim 7, wherein the fluorided silica-coated alumina has an average (d50) particle size from 30 to 150 microns.

10. The fluorided silica-coated alumina of claim 7, wherein:
    the bulk density is from 0.17 to 0.3 g/mL;
    the total pore volume is from 0.9 to 1.5 mL/g;
    the BET surface area is from 250 to 450 m²/g; and
    from 83 to 98% of the pore volume is in pores with diameters of greater than 6 nm.

11. The fluorided silica-coated alumina of claim 7, wherein:
    from 9.5 to 30% of the pore volume is in pores with diameters of greater than 20 nm;
    from 3.5 to 15% of the pore volume is in pores with diameters of greater than 40 nm;
    the fluorided silica-coated alumina has a pore volume of from 0.7 to 1.6 mL/g in pores with diameters of greater than 6 nm; and
    the fluorided silica-coated alumina has a pore volume of from 0.09 to 0.4 mL/g in pores with diameters of greater than 20 nm.

12. The fluorided silica-coated alumina of claim 7, wherein:
    from 65 to 98% of surface area is in pores with diameters of greater than 6 nm;
    from 19.5 to 55% of surface area is in pores with diameters of greater than 10 nm;
    the fluorided silica-coated alumina has a surface area of from 250 to 475 m²/g in pores with diameters of greater than 6 nm; and
    the fluorided silica-coated alumina has a surface area of from 78 to 200 m²/g in pores with diameters of greater than 10 nm.

13. The fluorided silica-coated alumina of claim 1, wherein from 80 to 99% of the pore volume is in pores with diameters of greater than 6 nm.

14. The fluorided silica-coated alumina of claim 13, wherein the fluorided silica-coated alumina contains:
    from 10 to 80 wt. % silica, based on a weight of silica-coated alumina; and
    from 0.5 to 18 wt. % F, based on a weight of the fluorided silica-coated alumina.

15. The fluorided silica-coated alumina of claim 13, wherein the fluorided silica-coated alumina has an average (d50) particle size from 30 to 150 microns.

16. The fluorided silica-coated alumina of claim 13, wherein:
    the bulk density is from 0.17 to 0.3 g/mL;
    the total pore volume is from 0.9 to 1.5 mL/g; and
    the BET surface area is from 250 to 450 m²/g.

* * * * *